United States Patent
Khan et al.

(10) Patent No.: US 11,454,501 B2
(45) Date of Patent: *Sep. 27, 2022

(54) PROVIDING CONSTRAINT TO A POSITION

(71) Applicant: HERE GLOBAL B.V., Eindhoven (NL)

(72) Inventors: Muhammad Irshan Khan, Tampere (FI); Jari Syrjärinne, Tampere (FI); Lauri Wirola, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,491

(22) Filed: Feb. 13, 2020

(65) Prior Publication Data

US 2020/0182624 A1 Jun. 11, 2020

Related U.S. Application Data

(63) Continuation of application No. 15/536,435, filed as application No. PCT/EP2014/078218 on Dec. 17, 2014, now Pat. No. 10,571,276.

(51) Int. Cl.
*G01C 21/32* (2006.01)
*G01C 21/20* (2006.01)
(Continued)

(52) U.S. Cl.
CPC ......... *G01C 21/206* (2013.01); *G01C 21/005* (2013.01); *G01C 21/32* (2013.01); *G06F 3/04815* (2013.01); *G06F 16/00* (2019.01)

(58) Field of Classification Search
CPC .... G06F 16/00; G06F 3/04815; G06F 1/3218; G01C 21/32; G01C 21/206;
(Continued)

(56) References Cited

U.S. PATENT DOCUMENTS 8,548,738 B1 10/2013 Kadous et al.
8,825,388 B2 9/2014 Khorashadi et al.
(Continued)

FOREIGN PATENT DOCUMENTS

CN 103003667 A 3/2013
CN 103120000 A 5/2013
(Continued)

OTHER PUBLICATIONS

Charlmers et al., Meta data to support context aware mobile applications, 2004, IEEE, p. 1-12 (Year: 2004).*

(Continued)

*Primary Examiner* — McDieunel Marc
(74) *Attorney, Agent, or Firm* — Alston & Bird LLP

(57) ABSTRACT

An apparatus is provided that determines, based on a geometrical criterion and at least one map object of plurality of map objects, whether a map element of a first map element type or a second map element type shall be created; wherein elements of the first map element type are intended to be usable for applying a constraint to a user position and wherein elements of the second map element type are intended to be less usable for applying a constraint to a user position compared to the elements of the first map element type; and creates a map element according to the determined map element type, the created map element being associated with the at least one map object.

20 Claims, 15 Drawing Sheets

(51) Int. Cl.
*G01C 21/00* (2006.01)
*G06F 3/04815* (2022.01)
*G06F 16/00* (2019.01)

(58) Field of Classification Search
CPC .. G01C 21/3667; G01C 21/005; G06N 20/00; H04W 4/70; H04W 4/021; H04W 4/029; H04W 4/33; G06T 11/206; G06T 17/05; G06T 19/00; G06T 15/04; H04N 13/239; G06Q 30/0261; G06Q 90/20; A47L 9/2894; A47L 9/2873; A47L 9/28; A47L 9/0477; A47L 11/4061; A47L 9/2852; A47L 9/2847; A47L 11/4011; A47L 9/2857; A47L 9/2826; A47L 9/30; A47L 11/4063; A47L 2201/02; A47L 2201/04; A47L 2201/028; A47L 2201/022; A47L 2201/06; A47L 2201/024; B25J 9/1676; B25J 9/1697; G05D 1/0044; G05D 1/0248; G05D 1/0246; G05D 1/0219; G05D 1/0214; G05D 2201/0208; G05D 2201/0203

See application file for complete search history.

(56) References Cited

U.S. PATENT DOCUMENTS

| | | | |
|---|---|---|---|
| 9,424,545 | B1* | 8/2016 | Lee ............... G06O 10/063114 |
| 10,571,276 | B2* | 2/2020 | Khan .................... G01C 21/32 |
| 2003/0093219 | A1 | 5/2003 | Schultz et al. |
| 2007/0082674 | A1* | 4/2007 | Pedersen ................ H04L 45/02 455/450 |
| 2007/0242084 | A1* | 10/2007 | Bowman .............. G01C 21/367 345/629 |
| 2009/0043504 | A1 | 2/2009 | Bandyopadhyay et al. |
| 2010/0302236 | A1* | 12/2010 | Kinnan ................... G06T 15/30 345/419 |
| 2012/0044265 | A1 | 2/2012 | Khorashadi et al. |
| 2012/0290254 | A1 | 11/2012 | Thrun et al. |
| 2013/0053056 | A1 | 2/2013 | Aggarwal et al. |
| 2013/0244691 | A1 | 9/2013 | Kelly |
| 2013/0260771 | A1 | 10/2013 | Wirola et al. |
| 2013/0321269 | A1* | 12/2013 | Beaurepaire ....... G01C 21/3682 345/158 |
| 2013/0321398 | A1* | 12/2013 | Howard ................. G06T 19/20 345/419 |
| 2013/0345975 | A1* | 12/2013 | Vulcano ........... G08G 1/096866 701/533 |
| 2014/0141803 | A1 | 5/2014 | Marti et al. |
| 2014/0156180 | A1 | 6/2014 | Marti et al. |
| 2014/0171098 | A1 | 6/2014 | Marti et al. |
| 2015/0019121 | A1 | 1/2015 | Gao et al. |
| 2015/0161440 | A1 | 6/2015 | Chao et al. |
| 2015/0339848 | A1* | 11/2015 | Barnes .................... G06F 16/29 345/629 |
| 2016/0085831 | A1 | 3/2016 | Chao et al. |
| 2016/0161592 | A1 | 6/2016 | Wirola et al. |
| 2017/0221170 | A1* | 8/2017 | Pellow ............... G06Q 30/0261 |
| 2017/0350708 | A1* | 12/2017 | Khan .................... G01C 21/206 |
| 2018/0245916 | A1* | 8/2018 | Ivanov ................. H04W 4/025 |
| 2020/0400454 | A1* | 12/2020 | van der Molen ...... G01C 21/32 |
| 2021/0089040 | A1* | 3/2021 | Ebrahimi Afrouzi ....................... A47L 9/2894 |

FOREIGN PATENT DOCUMENTS

| | | |
|---|---|---|
| CN | 103650606 A | 3/2014 |
| WO | WO 2012/009328 A1 | 1/2012 |
| WO | WO 2013/059197 A2 | 4/2013 |
| WO | WO 2014/016602 A1 | 1/2014 |

OTHER PUBLICATIONS

Cutinoh et al., A high-level compilation toolchain for heterogeneous systems, 2009, IEEE, p. 9-18 (Year: 2009).*

Xue et al., Checking validity of topic maps with Drools, 2010, IEEE, p. 1-4 (Year: 2010).*

Chiang et al., SVG Map Delivery Scheme for Resources Constrained Mobile Phones, 2007, IEEE, p. 2525-2530 (Year: 2007).*

Chen et al., Privacy-Aware High-Quality Map Generation with Participatory Sensing, 2015, IEEE, pp. 719-732 (Year: 2015).*

Dichev et al., View-Based Semantic Search and Browsing, 2007, IEEE, pp. 1-7 (Year: 2007).*

Bouillet et al., Scalable, Real-Time Map-Matching Using IBM's System S, 2010, IEEE, pp. 249-257 (Year: 2010).*

Steiner et al., Location utility-based reduction, 2015, IEEE, pp. 479-486 (Year: 2015).*

Cruz et al., "Landscape specification resizing", 2014, IEEE, p. 1-10 (Year 2014).

Davidson, P. et al., Application of Particle Filters for Indoor Positioning Using Floor Plans, [online] [retrieved Sep. 24, 2019]. Retrieved from the Internet: https://www.tkt.cs.tut.fi/research/nappo_files/Davidson_UPINLBS2010.pdf (2010) 4 pages.

Gao, Y. et al., XINS: The Anatomy of an Indoor Positioning and Navigation Architecture, MLBS '11 (Sep. 2011) 41-50.

International Preliminary Report on Patentability for International Patent Application No. PCT/EP2014/078218 dated Jun. 20, 2017, 2 pages.

International Search Report and Written Opinion for Application No. PCT/EP2014/078218 dated Mar. 3, 2015, 22 pages total.

Kahn, M. I. et al., Investigating Effective Methods for Integration of Building's Map With Low Cost Inertial Sensors and Wifi-based Positioning, IEEE 2013 International Conference on Indoor Positioning and Indoor Navigation (IPIN) (dated Oct. 2013), pp. 1-8.

Notice of Allowance for U.S. Appl. No. 15/536,435 dated Aug. 14, 2019.

Notice of Allowance for U.S. Appl. No. 15/536,435 dated Oct. 18, 2019.

Office Action for European Application No. 14 815 685.4 dated Dec. 6, 2018, 8 pages.

Office Action for U.S. Appl. No. 15/536,435 dated Feb. 15, 2019.

Office Action for U.S. Appl. No. 15/536,435 dated Jun. 7, 2019.

Office Action for Chinese Application No. 201480084653.0 dated Jun. 3, 2020, 7 pages.

Summons to Attend Oral Proceedings for European Application No. 14815685.4 dated Sep. 1, 2020, 8 pages Minutes of the Oral Proceedings for European Application No 14815685.4 dated Apr. 16, 2021, 53 pages.

Office Action for Chinese Application No. 201480084653.0 dated May 8, 2021, 22 pages.

Extended European Search Report for European Application No. 21191840.4 dated Dec. 9, 2021, 10 pages.

* cited by examiner

PROVIDING CONSTRAINT TO A POSITION

CROSS-REFERENCE TO RELATED APPLICATIONS

This application is a continuation of U.S. application Ser. No. 15/536,435, filed Jun. 15, 2017, which is a national stage entry of International Application No. PCT/EP2014/078218, filed Dec. 17, 2014, the entire contents of which are incorporated herein by reference.

FIELD OF THE DISCLOSURE

The invention relates to the field of positioning and more specifically to providing constraints to a position.

BACKGROUND

Satellite signal based positioning technologies, which are mainly used outdoors, may not suit to deliver a satisfactory performance when used for indoor positioning, since satellite signals of global navigation satellite systems (GNSS), like the global positioning system (GPS), may not penetrate through walls and roofs strongly enough for an adequate signal reception indoors. Thus, these positioning technologies may not be able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to a first aspect of the invention comprises, performed by at least one apparatus, determining, based on a geometrical criterion and at least one map object of plurality of map objects, whether a map element of a first map element type or a second map element type shall be created; wherein elements of the first map element type are intended to be usable for applying a constraint to a user position and wherein elements of the second map element type are intended to be less usable for applying a constraint to a user position compared to the elements of the first map element type; and creating a map element according to the determined map element type, the created map element being associated with the at least one map object.

An example embodiment of a method according to a second aspect of the invention comprises, performed by at least one apparatus, determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, determining a constraint to be applied to the position based on the map element.

An example embodiment of a first apparatus according to a first aspect of the invention or the second aspect of the invention comprises means for performing the actions of any embodiment of the presented example method of the first aspect or of the presented example method of the second aspect, respectively.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the first aspect of the invention or the second aspect of the invention comprises at least one processor and at least one memory including computer program code, the at least one memory and the computer program code configured to, with the at least one processor, cause the apparatus at least to perform the actions of any embodiment of the presented example method of the first aspect or of the presented example method of the second aspect, respectively.

Any of the described apparatuses may comprise only the indicated components or one or more additional components.

Moreover an example embodiment of a system is presented, which comprises any embodiment of any presented example apparatus of the first aspect or of the presented example apparatus of the second aspect, respectively. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method of the first aspect or of the presented example method of the second aspect, respectively, when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 8 is a schematic visualization of created floor plan according to an example embodiment of;

DETAILED DESCRIPTION OF THE FIGURES

Figure 1:
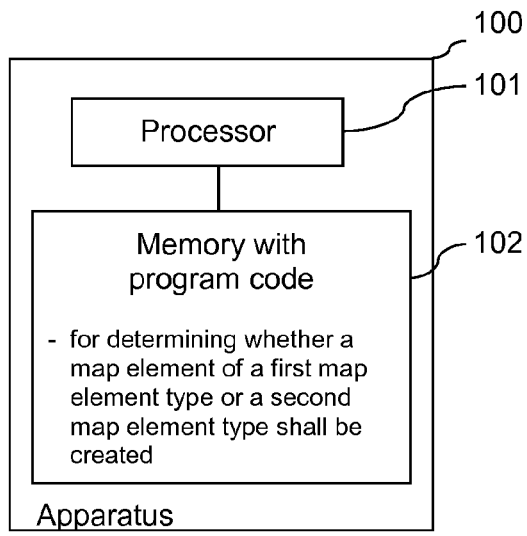
FIG. 1 is a schematic block diagram of an example embodiment of an apparatus according to a first aspect.

FIG. 1 is a schematic block diagram of an example embodiment of an apparatus 100 according to a first aspect of the invention. Apparatus 100 comprises a processor 101 and, linked to processor 101, a memory 102. Memory 102 stores computer program code for determining whether a map element of a first map element type or a second map element type shall be created. Processor 101 is configured to execute computer program code stored in memory 102 in order to cause an apparatus to perform desired actions.

Apparatus 100 could be a stationary device, like a dedicated quality assurance server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus determines, based on a geometrical criterion and at least one map object of plurality of map objects, whether a map element of a first map element type or a second map element type shall be created. (action 201) For instance, elements of the first map element type are intended to be usable for applying a constraint to a user position and elements of the second map element type are intended to be less usable for applying a constraint to a user position compared to the elements of the first map element type.

Map objects of said plurality of map objects may for instance represent walls, corridors, doors, stairs, exits or any element which is capable to represent a part of a map. As an example, said map objects may represent a floor plan of a building or a part of a floor plan of a building, wherein this floor plan may represent an indoor floor plan.

The at least one map object which is used for determining whether a map element of a first map element type or a second map element type shall be created (action 201) might represent at least one map object being at least partially or completely associated with an area in the floor plan. For instance, this area may represent an indoor area which might represent a room, a corridor, a hall (e.g. a very large room). As an example, such an area might represent an area accessible by a person.

Figure 3:
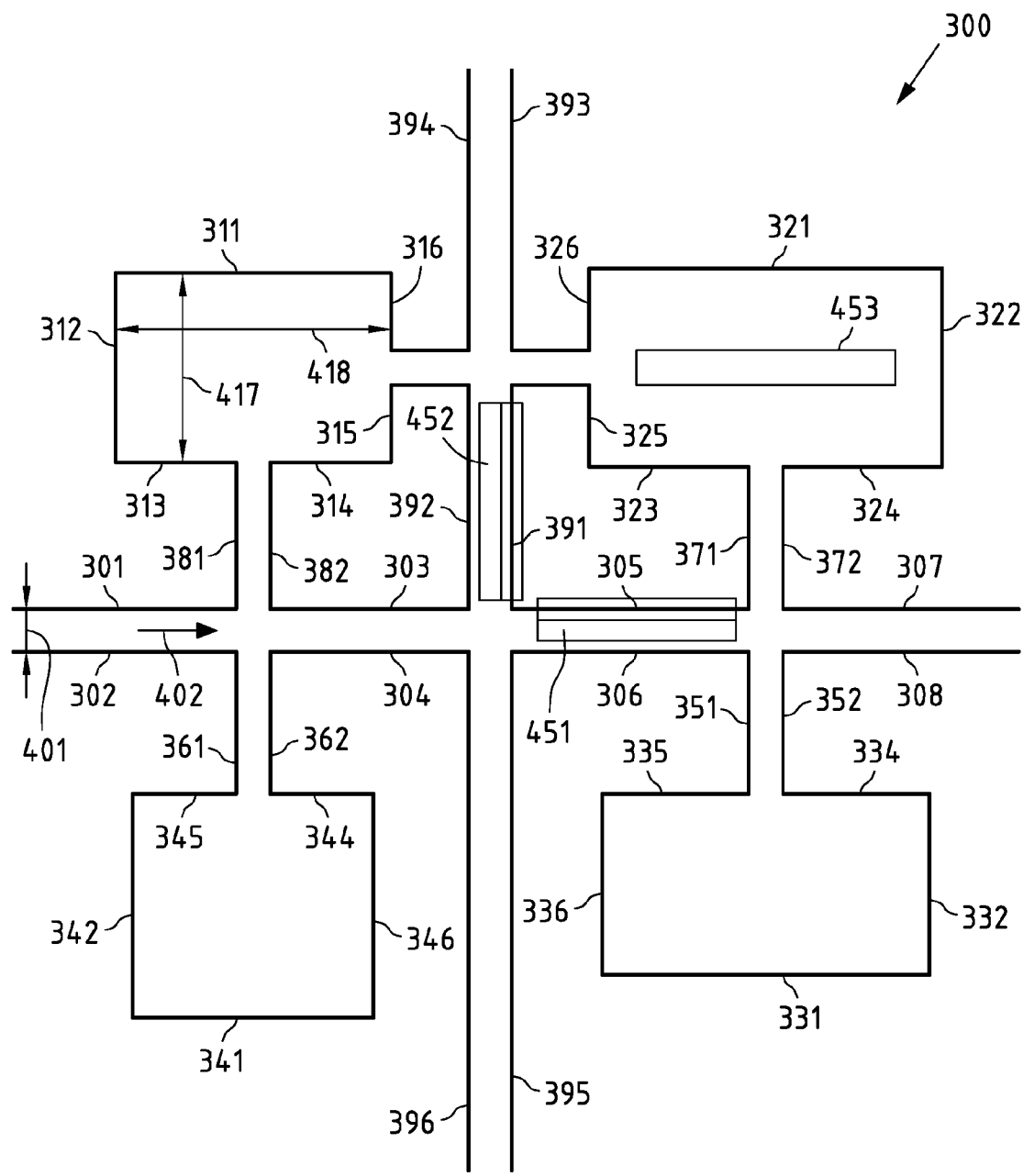
FIG. 3 is a schematic visualization of a plurality of map objects.

An example of map objects 301, 302, . . . , 396 is visualized in FIG. 3. For instance, said map objects 301, 302, . . . , 396 may represent a floor plan of a building at a part of a floor plan of a building, in particular it may be an indoor floor plan.

In an example embodiment, map objects 301 and 302 may represent walls defining an area in between, wherein this area may be considered to represent a corridor or a part of a corridor. Thus, for instance, map objects 301 and 302 could be used as the at least one map object in action 201. Or, as another example, map objects 311, 312, 313, 314, 315 and 316 may represent walls defining an area in between, wherein this area may be considered to represent a room. Thus, for instance, map objects 311, 312, 313, 313, 314, 315 and 316 or some of those map objects could be used as the at least one map object in action 201. It has to be noted that even one map object may be considered to be associated with an area in a floor plan, e.g., when this map objects represents a single wall having a curved shape which might at least partially or completely surround an area, wherein this map object could for instance describe a circular shape.

In an example embodiment, said geometrical criterion might be configured to be used for determining whether a dimension of an area associated with the at least one map object of the plurality of map objects represents a narrow dimension or not, wherein, as a non-limiting example, such a narrow dimension might be assumed to be present if a distance of an area in one dimension (e.g. one dimension of a two-dimensional floor plan) is below a distance threshold.

If said dimension of an area being associated with the at least one map object represents a narrow dimension, it may be determined that a map element of the first map element type shall be created, because elements of the first may element type may be intended to be usable for applying a constraint to a user position. Due to the presence of a narrow dimension of an area associated with the at least one map object, information based on such an area might be considered to be usable for applying a constraint to a user position. For instance, a corridor at least partly defined by at least one map object (e.g., map objects 301 and 303) might comprise a narrow dimension (e.g. indicated by reference sign 401) in the direction being orthogonal to the direction 402 of the corridor. Accordingly, information based on such an area could be used for constraining a position in direction being orthogonal to the direction 402, for instance, if a person walks through this corridor and a position estimated by a positioning system might not be very accurate.

Or, as an example, if the dimensions of an area being associated with the at least one map object represent non-narrow dimensions, it may be determined that a map element of the second map element type shall be created, because elements of the second map element type may be intended to be less usable for applying a constraint to a user position compared to the elements of the first map element type. Thus, for instance, large rooms or halls might be identified which may be not useful or only less useful for applying constraint to a human motion.

Furthermore, a map element according to the determined map element type is created, the created map element being associated with the at least one map object. (action 202). Thus, for instance, if it is determined that a map element according to the first map element type shall be created, a map element according to the first map element type is created. Or, if it is determined that a map element according to the second map element type shall be created, a map element according to the second map element type is created.

As an example, with respect to map objects 301 and 302 depicted in FIG. 3, it may be determined that a map element of the first map element type shall be created, as explained above. This map element of the first map element may be created based on the at least one map object 301, 302 of the plurality of map object and may represent a one-dimensional representation in a floor plan being associated with the at least one map object 301, 302.

In an example embodiment, the area associated with at least one map object 301, 302, which might be assumed to represent a two-dimensional map element, might be reduced in one dimension to a one-dimensional in order to create a one-dimensional element. For instance, the dimension determined to be a narrow-dimension, e.g. dimension 401 in FIG. 3, might be omitted and thus a one-dimensional map element 402' may be created based on the at least one map object 301, 302, wherein the one-dimensional map element 402' might be considered to represent a discrete graph 402'.

In an example embodiment, the discrete graph 402' may represent a discrete graph in a floor plan (e.g., a two-dimensional plan) being descriptive of a route associated with the at least one map element 301, 302, wherein this route may be fixed in the narrow-dimension 401. It has to be understood that this route must not be necessarily be fixed in the narrow-dimension 401. For instance, of the at least one map object would be associated with a curved area having a narrow-dimension, e.g. a curved corridor, a discrete graph could be fitted through the route of corridor, e.g. through the mid of the corridor, wherein the positions in the narrow-dimension described be discrete graph would change due to the curved nature of the corridor and/or the curve of the corridor or other curved area could be modeled with two or more linear discrete graphs.

As an example, this discrete graph 402' may represent a discrete graph through the mid position of the area defined by the at least one map object 301, 302, wherein the discrete graph may be substantial or complete orthogonal to the narrow-dimension.

For instance, it might be assumed that the map object 301, 302 defines a corridor and thus a discrete graph 402' might be created representing the route of the corridor.

These discrete graphs may be used for applying constraints to human motion in appropriate parts in the floor plan.

Thus, elements of the first map element type may represent one-dimensional elements. For instance, such a one-dimensional element may represent a one-dimensional route being associated with the at least one map object.

As an example, with respect to map objects 311, 312, 313, 314, 315 and 316 depicted in FIG. 3, it may be determined that a map element of the second map element type shall be created, as explained above. This map element of the second map element may be created based on the at least one map object 311, 312, 313, 314, 315 and 316 of the plurality of map object, wherein the term "based on the at least one map object" has to be understood that all map objects or only one or at least two of the map objects are used for creating the map element of the second map element.

In an example embodiment of said first aspect, said elements of the second map element type may represent multi-dimensional elements, wherein said multi-dimensional elements may represent open spaces being associated with the at least one map object. As an example, elements second map element type may be a representative of an area being at least partially associated with the at least one map object.

Thus, area 411 may be created as multi-dimensional map element 411 of the second map element type based on the at least one map object 311, 312, 313, 314, 315 and 316, wherein this multi-dimensional map element 411 represents a multi-dimensional map element 411 (e.g., two-dimensional) being representative of an open space, which may for instance be not used for applying constraints to human motion due to the large area in both-dimension.

In an example embodiment, apparatus 100 may comprise a database, wherein the created map element (action 202) is stored in this database. It has to be understood that this database may be arranged at a position being different from apparatus 100.

Figure 5:
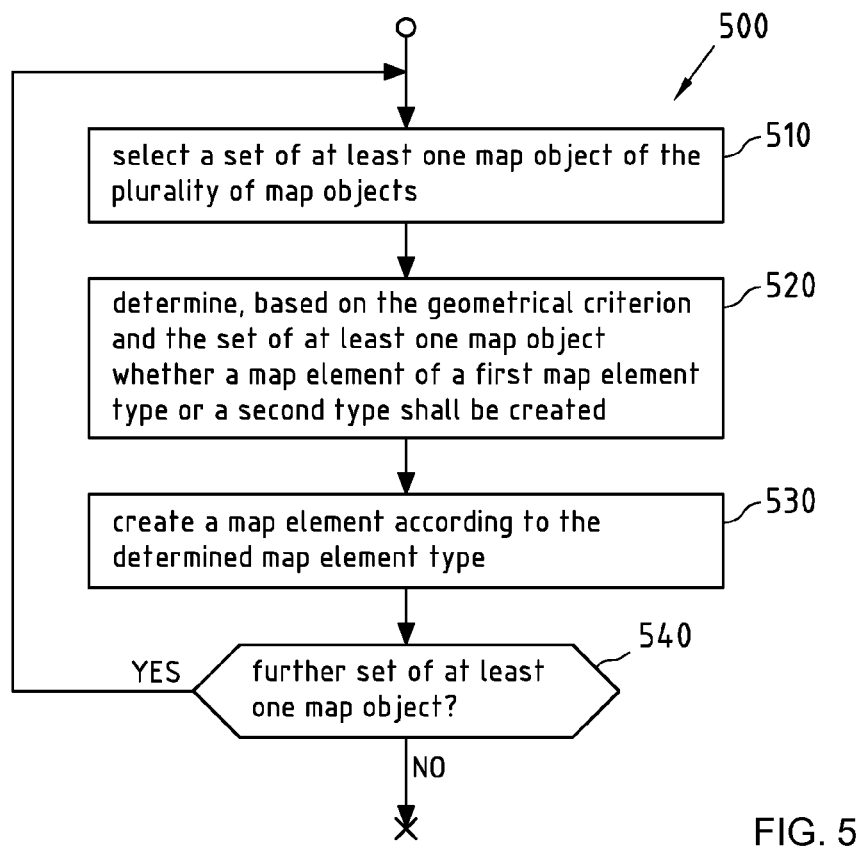
FIG. 5 is a flow chart illustrating an example embodiment of an operation in apparatus of FIG. 1.

Example operations in the apparatus of FIG. 1 will now be described with reference to FIG. 5 depicting a flow chart 500 illustrating an example embodiment of the first aspect.

It may be assumed that there are a plurality of map objects, as explained above. For instance, the map objects of the plurality of map objects may be associated with one floor plan, or they might be associated with at least two floor plans, wherein a floor plan may represent in indoor floor of a building. For instance, in FIG. 9a two floor plans 910 and 930 are used, wherein each floor plan 910 and 930 may be associated with a level in a building, wherein these level may at least partially being different from each other.

A set of at least one map object of the plurality of map objects is selected. (action 510). The selected at least one map object might represent at least one map object being at least partially or completely associated with an area in the floor plan. For instance, this area may represent an indoor area which might represent a room, a corridor, a hall (e.g. a very large room). As an example, such an area might represent an area accessible by a person.

Then, based on a geometrical criterion and the selected set of at least one map object of plurality of map objects, it is determined whether a map element of a first map element type or a second map element type shall be created. (action 520) For instance, elements of the first map element type are intended to be usable for applying a constraint to a user position and elements of the second map element type are intended to be less usable for applying a constraint to a user position compared to the elements of the first map element type. This determining may be performed as explained with respect to action 201 in FIG. 2.

Furthermore, a map element according to the determined map element type is created, wherein the created map element being associated with the at least one map object. (action 530). This creating of a map element may be performed as explained with respect to action 202 in FIG. 2.

Then it may be checked whether there is a further set of at least one map object in the plurality of map objects.

(action 540). If yes, the method 500 starts again with selecting this further set of at least one map object of the plurality of map objects. (action 510).

Thus, for instance, method 500 may be used for processing a floor plan being associated with at least two map objects of the plurality of map objects of being associated with all map objects of the plurality of map objects, wherein different areas of the floor plan can be processed by selected a set of at least one map object being associated with the respective area.

In an example embodiment of said first aspect, performing said selecting a set of at least one map object of the plurality of map objects (action 510), said determining whether a map element of a first map element type or a second map element type shall be created based on the selected set of at least one map object (action 520); and said creating a map element according to the determined map type (action 530), the created map element being associated with the selected set of at least one map object, may be performed for a plurality of sets of at least one map object of the plurality of map objects in order to create a plurality of map elements.

Accordingly, map elements according to the respectively determined map element type can be created and may be stored in a database, wherein the map elements stored in the database may be considered to represent a map of the floor plan.

Figure 6A:
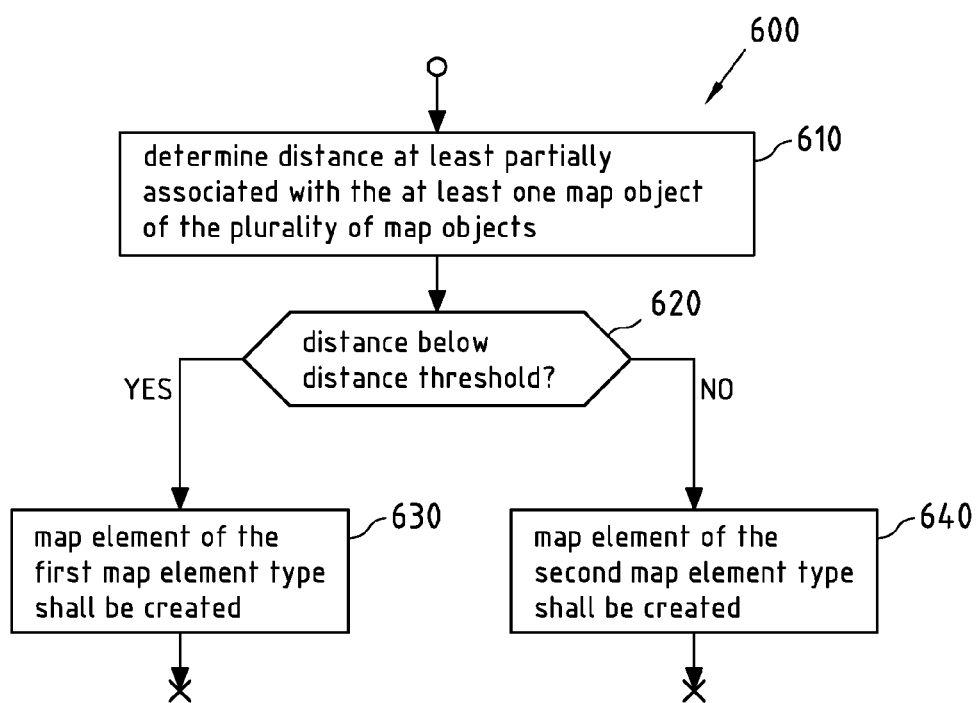
FIG. 6a is a flow chart illustrating a second example embodiment of an operation in apparatus of FIG. 1.

In an example embodiment of said first aspect, the geometric criteria comprises a distance threshold, and wherein said determining based on a geometrical criterion and at least one map object of the plurality of map objects whether a map element of a first map element type or a second map element type shall be created (action 201 or action 510) comprises checking whether a distance associated with the at least one map object of the plurality of map object is below the distance threshold. This example embodiment will be explained with respect to the example method 600 depicted in FIG. 6a.

The at least one map object may represent the at least one map object used as basis to determine whether an element of a first map element type or a second map element type shall be created (action 201), wherein the at least one map object might represent the set of at least one map object in method 500.

A distance at least partially associated with this at least one map object is determined. (action 210) For instance, this distance may represent a distance between two opposing sides of an area being at least partially associated with the at least one map element. As an example, if there a different opposing side of an area, those opposing sides may be selected for determining a distance which provides the smallest distance compares to the distances of other opposing sides of the area. Accordingly, for instance, the distance may represent a distance in direction of the narrowest-dimension of the area.

As an example, such a distance may represent the distance between two opposing walls, which define an area at least partially, e.g. the distance between opposing walls 301 and 302 or between opposing walls 303 and 304 or between opposing walls 311 and 313 in FIG. 300.

With respect to opposing walls 311 and 313, it may be determined that map objects 311, 312, 313, 314, 315 and 316 can be associated with a rectangular area which may define the floor of a room or hall, wherein those map objects may represent walls. A first distance associated with this area and thus at least partially associated with the set of map objects 311, 312, 313, 314, 315 and 316 would be the distance 418 between the wall 312 in the left hand sight and one of the opposing walls 316 and 315 of the right hand sight of the floor plan 300. A second distance associated with this area and thus at least partially associated with the set of map objects 311, 312, 313, 314, 315 and 316 would be the distance 417 between the wall 311 and one of the opposing walls 313 and 314 of the floor plan 300. Since the second distance 417 is lower than the first distance 418, the second distance may be determined as distance in action 510.

It is then checked whether the determined distance is below a distance threshold. (action 602). For instance this distance threshold may be in the range between 0.01 m and 10 m, wherein it may be 9 m, 7 m, 5 m, 4 m, 3 m, 2 m, 1 m or any other suitable value.

If the distance is below the distance threshold, it may be decided that a map element of the first map element type shall be created (action 630), since if there is a narrow distance with respect to the at least one map object, the at least one map object may be at least partially useful for applying constraints to a user position.

On the other hand, if the distance is equal or above the distance threshold, it may be decided that a map element of the second map element type shall be created, since it can be assumed that the at least one map object is associated with a huge room or hall which are less useful or non-useful for applying constraints to a user position. (action 640).

As an example, the distance threshold may depend on the building associated with the plurality of map objects, e.g. on the type of the building and/or the dimension of the building.

For instance, there may exist at least two different distance thresholds, wherein each of the at least two different thresholds may be associated with a different building type. For instance, one building type may be representative of office buildings, wherein a respective distance threshold of the at least two different distance thresholds represents a distance threshold value being associated with office building, wherein this distance threshold may represent 3 m (but any other well-suited value may also applied). Or, another building type may be representative of shopping malls, wherein a respective distance threshold of the at least two different distance thresholds represents a distance threshold value being associated with shopping malls, wherein this distance threshold value is higher than the distance threshold value being associated with office buildings. For instance, this distance threshold value being associated with shopping malls may represent 5 m (but any other well-suited value may also applied).

As an example, the distance threshold may be determined based on checking the dimension of at least one map object or at least two map objects of the plurality of map objects. For instance, if information regarding the dimension of corridors is available, the distance threshold may be determined based on this information, wherein the distance threshold may be set to a value being higher than the largest narrow-dimension of corridors.

Figure 2:
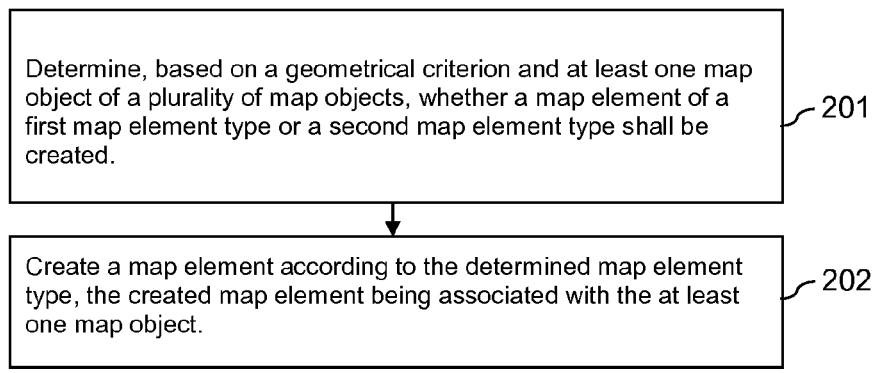
FIG. 2 is a flow chart illustrating an example embodiment of a method according to the first aspect.

For instance, the method 600 may be performed by action 201 in FIG. 2 or by action 520 in FIG. 5 in order to determine whether a map element of the first map element type or a map element of the second map element type shall be created.

Figure 6B:
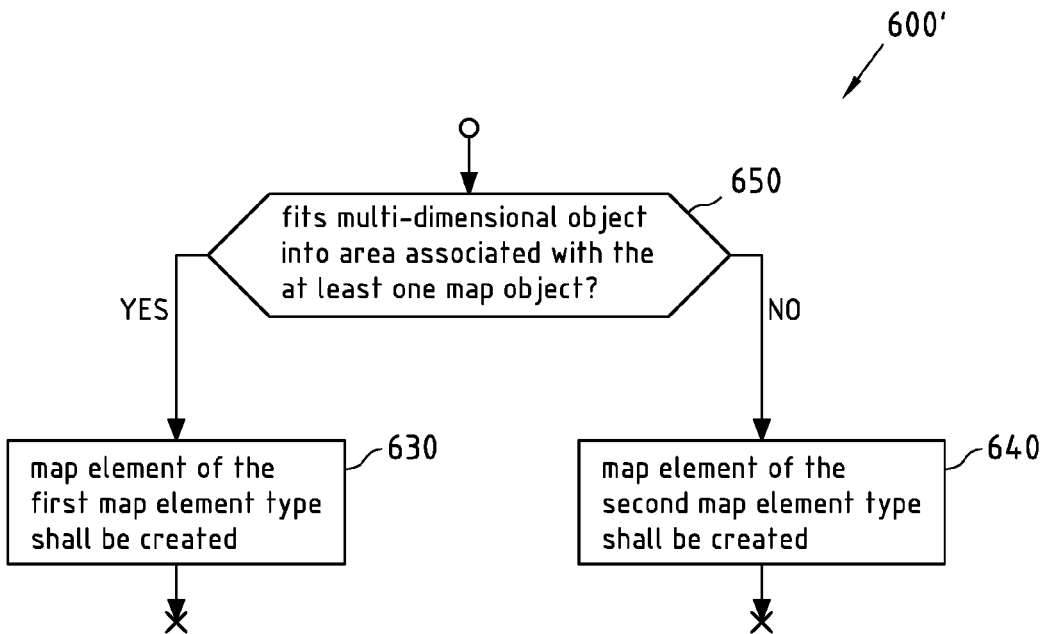
FIG. 6b is a flow chart illustrating a third example embodiment of an operation in apparatus of FIG. 1.

In an example embodiment, the geometrical criteria comprises a multi-dimensional reference object, wherein said determining based on a geometrical criterion and at least one map object of the plurality of map objects whether a map element of a first map element type or a second map element type shall be created (action 201 or action 520) comprises checking whether the multi-dimensional reference object fits into an area associated with the at least one map object (action 650). This example embodiment will be explained with respect to the example method 600' depicted in FIG. 6b.

The size of the multi-dimensional reference object may be of such size that it may be assumed, if the reference object fits into an area, that this area is not usable or only less usable for applying constraints to a user position.

Thus, it is checked whether the multi-dimensional reference object fits into an area associated with the at least one map object, wherein this area may represent any area described above. If the multi-dimensional reference object does not cross any sides of the area, e.g. if the reference object does not cross any walls of the area, the multi-dimensional object fits into this area associated with the at least one map object and it is determined that a map element of the second map element type shall be created (action 640), wherein this map element of the second map element type is associated with the at least one map object. Thus, open spaces may be identified in the floor map when the multi-dimensional reference object fits into area.

If the multi-dimensional reference object does cross any at least one side of the area, e.g. if the reference object does cross at least one wall of the area, the multi-dimensional object does not fit into this area associated with the at least one map object and it is determined that a map element of the first map element type shall be created (action 363), wherein this map element of the first map element type is associated with the at least one map object.

For instance, said multi-dimensional reference object may represent a two-dimensional reference object.
being one of the following:
a circle;
a rectangle;
a polygon; and
an ellipse.

In an example embodiment, the size of the two-dimensional reference object may depend on one of the following ranges:
a radius between 1 m to 8 m in case of a circle; and
(1 m to 8 m)×(1 to 100 m) in case of a rectangular.

For instance, in case the two-dimensional reference object represents a polygon or an ellipse, the area of the polygon or ellipse may be chosen equal to an area of the above-defined circle or rectangular.

As an example embodiment, the size of the two-dimensional object may depend on the building associated with the plurality of map objects, e.g. on the type of the building and/or the dimension of the building.

As an example, the size of the two-dimensional reference object may depend on the building associated with the plurality of map objects. For instance, there may exist at least two different sizes, wherein each of the at least two different sizes is associated with a building type. For instance, one building type may be representative of office building, wherein a respective size of the two-dimensional reference object of the at least two different sizes represents a size being associated with office building, wherein, under the non-limiting assumption that the two-dimensional reference object represents a circle, the size of the circle may be associated with a radius of 2 m (but any other well-suited size may also applied, e.g. 1.5 m). Or, another building type may be representative of shopping malls, wherein a respective size of the at least two different sizes is associated with shopping malls and may represent a size being larger than the size being associated with office buildings. For instance, this size being associated with shopping malls may, under the non-limiting assumption that the two-dimensional reference object represents a circle, be associated with a radius of 5 m (but any other well-suited value may also applied, e.g. 4 m).

As an example, the size of the two-dimensional reference object may be determined based on checking the dimension of at least one map object or at least two map objects of the plurality of map objects. For instance, if information regarding the dimension of corridors is available, the size of the two-dimensional reference object may be determined based on this information.

As an example embodiment, multiple different multi-dimensional objects may be used in action 650. Thus, if one of the multiple different multi-dimensional objects does not fit into the area, it might be determined that a map element of the first map element type shall be created.

As an example embodiment, a multi-dimensional object (or the multiple different multi-dimensional objects) may be moved around a floor plan defined by map objects of the plurality of map objects, wherein at least one map object may be selected with respect to a respective position of the multi-dimensional object during movement. For instance, the at least one map object which is in a predefined distance range to the multi-dimensional object and/or which crosses the multi-dimensional object or is in the multi-dimensional object may be selected. As an example, this selection may be performed in action 510 of method 500. Furthermore, the multi-dimensional object may be moved around a floor plan in such a way that the inside of the multi-dimensional object is at least partially positioned in an indoor area like a room, or corridor or ball or the like of a floor.

For instance, as depicted as a non-limiting example in FIG. 3, a rectangular 451, 452, 453 may be chosen as multi-dimensional reference object. The explanations presented below are not restricted to a rectangular, it has to be understood the rectangular can be replaced with any multi-dimensional object.

As an example, the rectangular 451 may move to around a floor plan and may be positioned at least partially in an area defined by the map objects 305 and 306, wherein this area represents in indoor area of the floor. It is then checked whether this rectangular fits into the area being associated with the selected map objects 305 and 306, but due to the narrow distance between the map objects 305 and 306, it is not possible to fit the rectangular into the is area. Thus, it may be determined that a map element according to first element type is created (action 630) and a map element 405 according to the determined first map element type is created, as explained above (action 202 or action 530).

As an example, the rectangular 452 may move further around a floor plan and may be positioned at least partially in an area defined by the map objects 391 and 392, wherein this area represents in indoor area of the floor. Thus, moving may comprise rotating the rectangular. It is then checked whether this rectangular 452 fits into the area being associated with the selected map objects 391 and 392, but due to the narrow distance between the map objects 391 and 392, it is not possible to fit the rectangular into the is area. Thus, it may be determined that a map element according to first element type is created (action 630) and a map element 492 according to the determined first map element type is created, as explained above (action 202 or action 530).

As an example, the rectangular 453 may move further around a floor plan and may be positioned at least partially in an area defined by the map objects 321, 322, 323, 324, 325 and 326, wherein this area represents in indoor area of the floor. The rectangular object fits into the area associated with this set of map objects 321, 322, 323, 324, 325, and thus it may be determined that a map element according to second element type is created (action 650) and a map element 421 according to the determined second map element type is created, as explained above (action 202 or action 530).

Figure 4:
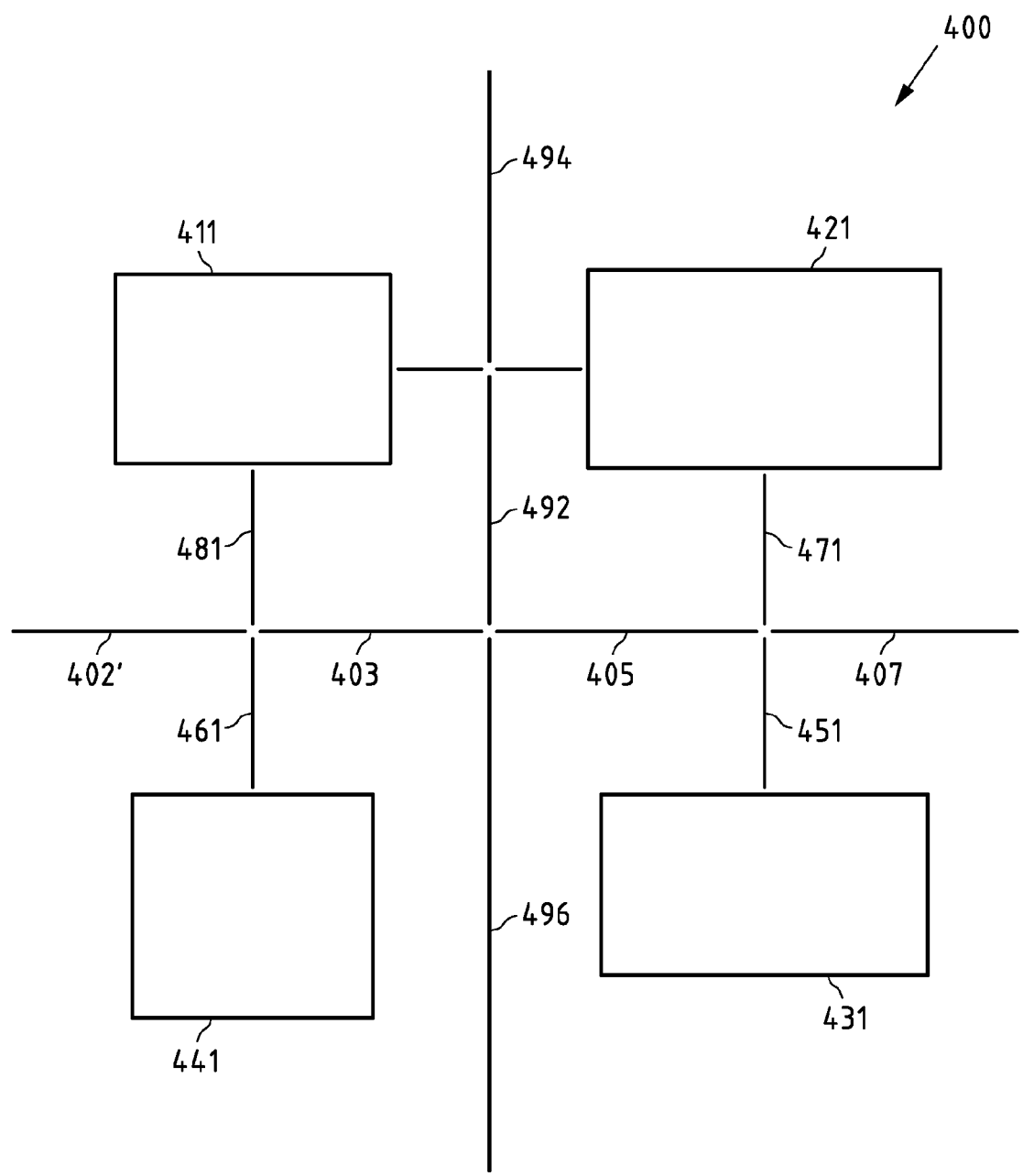
FIG. 4 is a schematic visualization of created map elements according to an example embodiment.

Thus, as an example, the method 600 or 600' may be used to determine whether a map element of the first map element type or a map element of the second map element type shall be created (action 202 or action 530), wherein as a result a plurality of map elements 402', 403, 405, 407, 492, 494, 496, 451, 471, 481, 461 of the first map element type may be created and a plurality of map elements 411, 421, 431, 441 may be created, as depicted as an example in FIG. 4.

Figure 7:
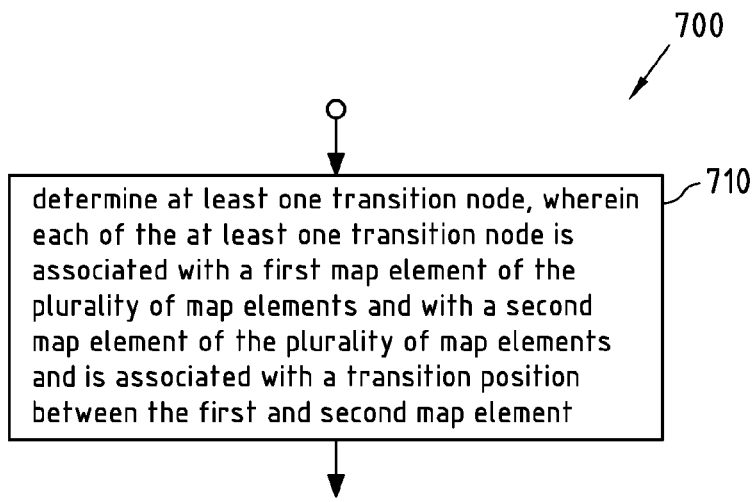
FIG. 7 is a flow chart illustrating a fourth example embodiment of an operation in apparatus of FIG. 1.

In an example embodiment of the first aspect, at least one transition node element is determined, wherein each of the at least one transition node element is associated with a first map element of the plurality of map elements and with a second map element of the plurality of map elements and is associated with a transition position between the first map element and the second map element (action 710). This example embodiment will be explained with respect to the example method 700 depicted in FIG. 7.

For instance, such a transition node may be used to link at least two map elements of the plurality of map elements together, wherein the transition node may describe a shared spatial location (e.g., latitude, longitude, height) between the at least two map elements. Thus, a transition node may be created at a position where it is possible to move from a first map element of the at least two map elements to another map element of the at least two map elements.

Figure 8:
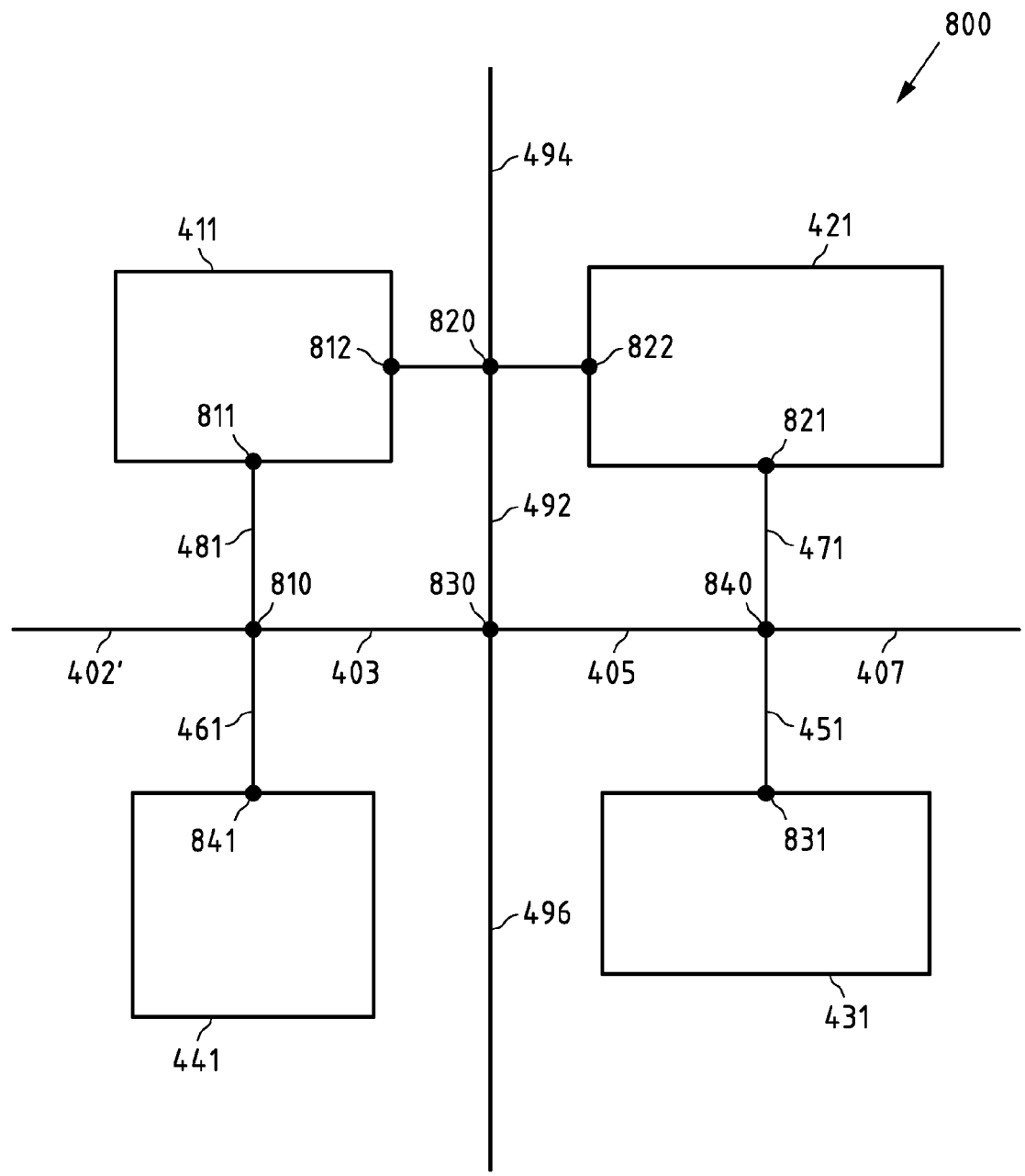

As an example, a transition node may be associated with a first map element of the first map element type and with a second map element of the second map element type. For instance, as depicted in FIG. 8, transition node 821 is associated with first map element 471 of the first map element type and with second map element 421 of the second map element type and may indicate that a transition can be made from the first element 472 to the second map element 421 and vice versa. Similarly, transition node 831 is associated with first map element 451 of the first map element type and with second map element 431 of the second map element type.

As an example, a transition node may be associated with a first map element of the first map element type and with a second map element of the first map element type. For instance, as depicted in FIG. 8, transition node 810 is associated with first map element 402' of the first map element type and with second map element 481 of the first map element type and may indicate that a transition can be made from the first element 402' to the second map element 481' and vice versa. Furthermore, this transition mode 810 may be associated with four map elements 402', 481, 461 and 403, wherein a transition is possible from a first map element of these four map elements 402', 481, 461 and 403 to another map element of these four map elements 402', 481, 461 and 403.

Furthermore, as an example, a transition node may be associated with a first map element of the second map element type and with a second map element of the first map element type. Thus, all combinations of map element types may be possible with respect to a transition node.

Accordingly, for instance, the transition nodes may be used to make a transition from a map element of the first map element type to a map element of the second map element type and/or vice versa, or to make a transition from a map element of the first map element type to a map element of the first map element type, or to make a transition from a map element of the second map element type to a map element of the second map element type.

An example of a map 800 comprising map elements of the first and second map element types and transition nodes is depicted in FIG. 8.

Accordingly, a plurality of transition nodes 810, 811, 812, 821, 822, 831 can be generated in order to connected map elements of a floor map 800.

For instance, a transition node may be associated with a location information which might include latitude, and/or longitude, and/or height or another positioning information.

Furthermore, as an example, at least one transition node may be associated with an entrance of a building. An entrance might be something that connects outside area of this building with inside area of this building (e.g. a door). For instance, such a transition node being associated with an entrance of a building might be further associated with a map element of the first or second map element type, wherein this map element is associated with the inside of the building. Furthermore, this transition node may be associated with another map element being outside this building. For instance, this other map element may represent a map element of the first or second type. As an example, this other map element may be connected to the transition node of another building. For instance, this other map element might be a bridge (e.g. a skywalk) to another building. Or, as another example, the transition node may be associated with another transition node of another building, wherein this other transition node may also be associated with an entrance of this other building.

As an example embodiment of the first aspect, at least one floor map each comprising a plurality of map elements of the first and second map element types and comprising at least one transition node can be created and stored in the database, wherein each floor map may be created as described above.

For instance, the at least one floor map may represent at least two floor maps. For instance, each floor map may be associated with a vertical position. The positions of different floor maps of the at least two floor maps may differ from each other or may be the same. As an example, the map elements of the plurality of map elements associated with a respective floor map of the at least two floor maps may be created based on method 500 and the at least one transition node of a respective floor map may be created based on method 700.

As an example embodiment, it may be determined whether a map connector element may be associated with a first floor map and a second floor map of the at least two floor maps. For instance, such a map connector element may be indicative of a connection between the first floor map and a second floor map. The map connector element may be chosen from a map element of the first map element type and a map element of the second map element type, wherein it may be determined whether a map element according to the first map element type or according to the second map element type shall be generated, e.g. similar or based on action 201 or action 510, wherein this determining may be performed at least partially in vertical direction. A map connector element may indicate a place which is used to change floors, e.g. stairs, elevators, ramps, escalators, etc.

It has to be understood that at least one map connector element may be created in order to connect a first floor map and a second floor map, wherein, if a plurality of map connector elements are created, transition nodes may be created in order to link map connector elements of the plurality map connector elements together.

Figure 9A:
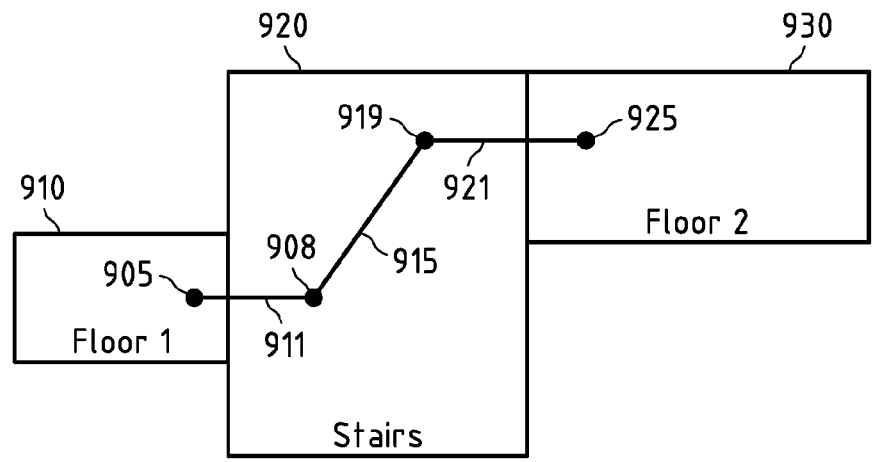
FIG. 9a is a schematic visualization of created map elements according to an example embodiment.

For instance, as depicted in FIG. 9a, at least one map connector element of the first map element type may be created, wherein this at least one map connector element comprises a first map connector element 911, a second map connector element 915 and a third map connector element 921, wherein the first and second map connector elements 911 and 915 are linked with transition node 908 and wherein the second and third map connector elements 915 and 925 are linked with map connector element 919. Furthermore, transition node 905 may be used to link the first map connector element 911 to a first floor plan 910, and transition node 925 may be used to link the third map connector element 921 to a second floor plan 920, wherein transition node 905 may link the first map connector element 911 to a map element of the first map element type and/or to a map element of the second map element type of the first floor plan 910, and wherein transition node 925 may link the third map connector element 911 to a map element of the third map element type and/or to a map element of the second map element type of the second floor plan 930.

This at least one connector element 911, 915, 921 connects the first floor map and the second floor map and may be created if is determined that the connection area between the first floor map and the second floor map has at least one narrow-dimension. For instance, the map connector element of the first map element type may represent a discrete graph.

Figure 9B:
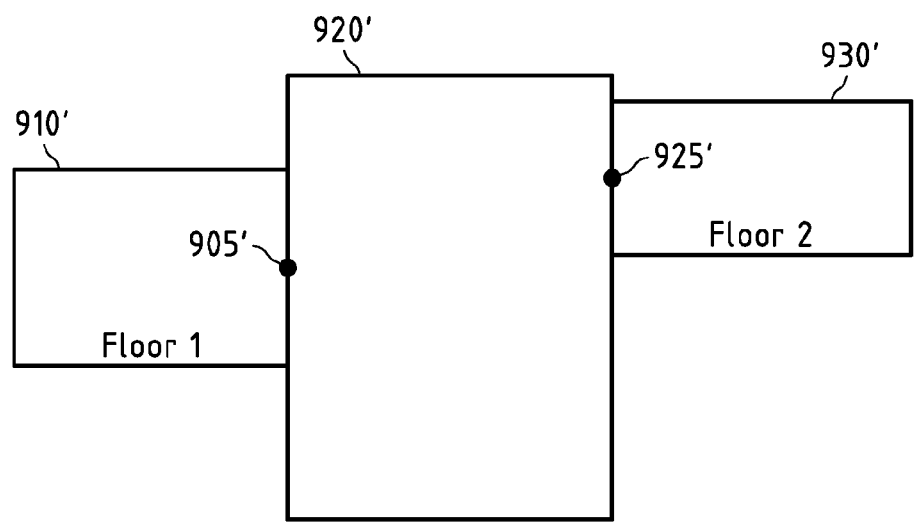
FIG. 9b is a schematic visualization of created map elements according to an example embodiment.

Or, as another example and as depicted as an example in FIG. 9b, a map connector element 920' of the second map element type may be created, wherein this map connector element 920' connects the first floor map 910' and the second floor map 920'. This map connector element 920' according the second map element type may be created if it is determined that the connection area between the first floor map and the second floor map has no narrow-dimension. For instance, the map connector element 920' of the second map element type may represent an area which might be assumed to indicate an open space.

For instance, a map connector element may be modeled based on their geometry to a discrete graph or an open space.

Figure 10:
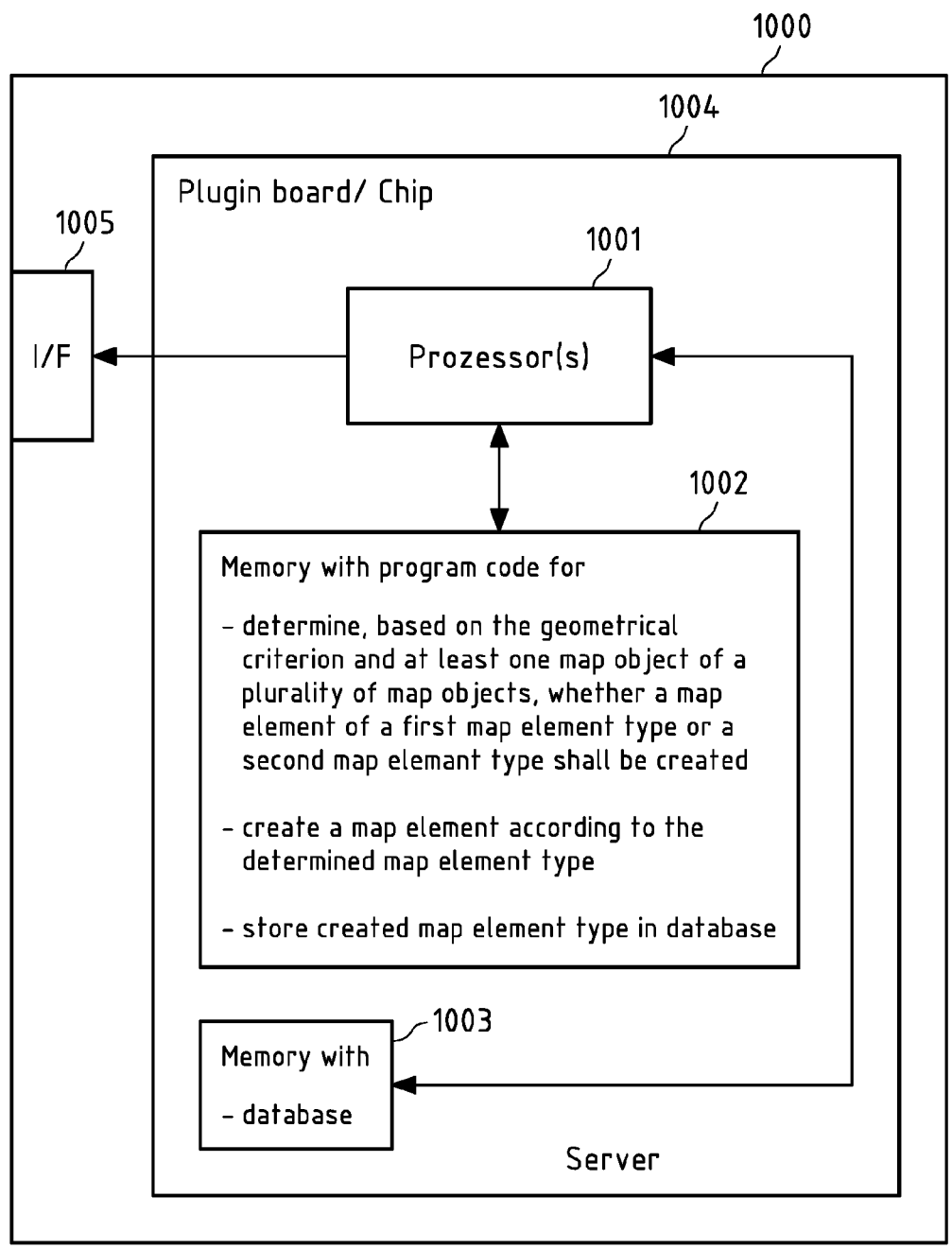
FIG. 10 is a schematic block diagram of an example embodiment of an apparatus according to the first aspect.

FIG. 10 is a schematic block diagram of an example embodiment of an apparatus according to the first aspect of the invention. In this case, the apparatus may represent a server 1000.

Server 1000 may be for instance a server that is provided specifically for determining, based on a geometrical criterion and at least one map object of a plurality of map objects, whether a map element of a first map element type or a second map element type shall be created, wherein elements of the first map element type are intended to be usable for applying a constraint to a user position and wherein elements of the second map element type are intended to be less usable for applying a constraint to a user position compared to the elements of the first map element type; and for creating a map element according to the determined map element type, the created map element being associated with the at least one map object, wherein the created map element type can be stored in a database. Server 1000 comprises a processor 1001 that is linked to a first memory 1002, to a second memory 1003 and to an interface (I/F) 1005.

Processor 1001 is configured to execute computer program code, including computer program code stored in memory 1002, in order to cause server 1000 to perform desired actions.

Memory 1002 stores computer program code for determining, based on a geometrical criterion and at least one map object of a plurality of map objects, whether a map element of a first map element type or a second map element type shall be created, wherein elements of the first map element type are intended to be usable for applying a constraint to a user position and wherein elements of the second map element type are intended to be less usable for applying a constraint to a user position compared to the elements of the first map element type; and for creating a map element according to the determined map element type, the created map element being associated with the at least one map object, and for storing the created map element type can be stored in a database. Some of the program code may be similar to the program code stored in memory 102. In addition, memory 1002 could store computer program code configured to realize other functions, for instance program code for generating positioning assistance data, for providing assistance data to mobile devices upon request and/or for performing positioning computations for mobile devices upon request, wherein this assistance data may comprise a constraint for a position. In addition, memory 1002 could also store other kind of data.

Processor 1001 and memory 1002 may optionally belong to a plug-in board or a chip with an integrated circuit 1004, which may comprise in addition various other components, for instance a further processor or memory.

Memory 1003 is configured to store data, including for example a database comprising created map elements. Furthermore, for instance, the database may comprise created transition nodes and/or connector elements. Furthermore, it may store data of received sets of fingerprints and parameter values of radio models. In addition, it could store other data, including for example assistance data for a WLAN based positioning.

It is to be understood that the data of memory 1003 could also be distributed to several memories, which may be partly or completely external to server 1000. For example, map elements, and/or transition nodes and/or connector elements that are stored for defining at least one map could be stored internal to server 1000 and computed assistance data, e.g. a constraint for a position, could be stored at an external memory that is accessible via another server.

Interface 1005 is a component which enables server 1000 to communicate with other devices, like mobile devices, via networks. It could also enable server 1000 to communicate with other entities, like other servers. Interface 1005 could comprise for instance a TCP/IP socket.

As an example embodiment, a system may comprise a server 1000 and a plurality of mobile devices. The system may further comprise a network, by way of example the Internet. The system further comprises a cellular communication network that is connected to the Internet. The system may further comprise a number of WLAN access points (AP).

It is to be understood that server 1000 could comprise various other components.

Component 1004 or server 1000 could be an example embodiment of an apparatus according to the first aspect of the invention. For instance, each of the embodiments described above might be implemented in server 1000, e.g. by appropriate computer program code stored in memory 1002.

Figure 11:
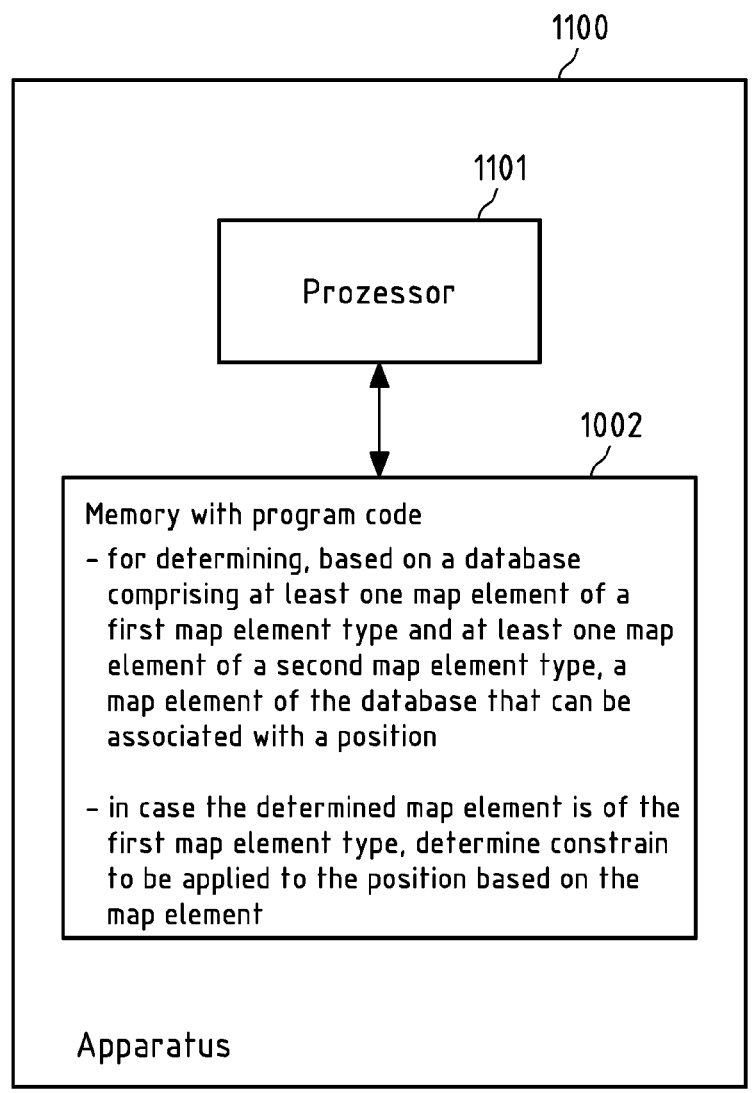
FIG. 11 is a schematic block diagram of an example embodiment of an apparatus according to a second aspect.

FIG. 11 is a schematic block diagram of an example embodiment of an apparatus 1100 according to a second aspect of the invention. Apparatus 1100 comprises a processor 1101 and, linked to processor 1101, a memory 1102. Memory 1102 stores computer program code for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, for determining a constraint to be applied to the position based on the map element.

Apparatus 1100 could be a stationary device, like a dedicated quality assurance server or some other server, or a mobile device, like a mobile communication device. A stationary device is configured to be stationary when in operation. A mobile device is configured to enable operation while the device is moving. Apparatus 1100 could equally be a module, like a chip, circuitry on a chip or a plug-in board, for a device. Optionally, apparatus 1100 could comprise various other components, like a data interface, a user interface, a further memory, a further processor, etc.

Figure 12:
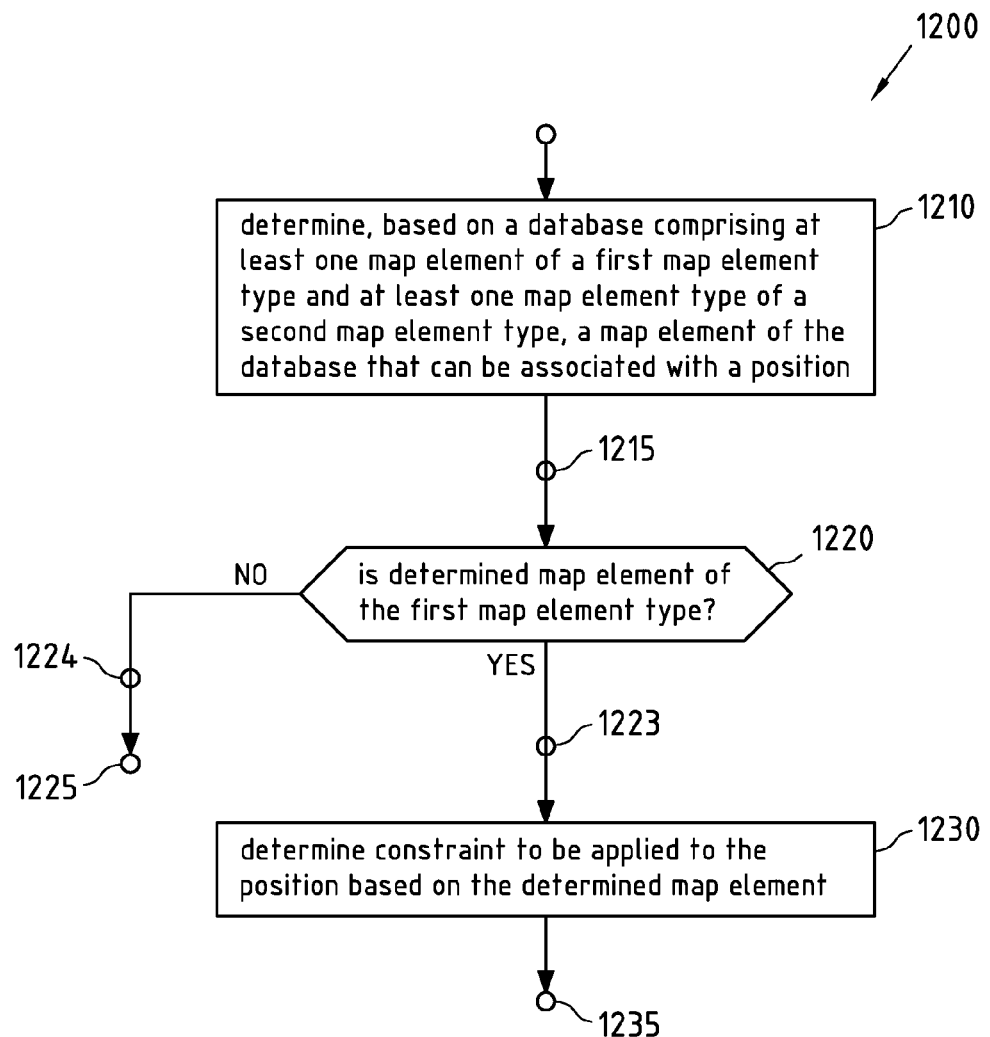
FIG. 12 is a flow chart illustrating an example embodiment of a method according to the second aspect.

An operation of apparatus 1100 will now be described with reference to the flow chart of FIG. 12. The operation is an example embodiment of a method according to the invention. Processor 1101 and the program code stored in memory 1102 cause an apparatus to perform the operation when the program code is retrieved from memory 1102 and executed by processor 1101. The apparatus that is caused to perform the operation may be apparatus 1100 or some other apparatus, for example but not necessarily a device comprising apparatus 1100.

The apparatus 1100 determines, based on a database comprising at least one map element of a first map element type and at least one map element of a second map element type, a map element of the database that can be associated with a position. (action 1200). Map elements of the first map element type are intended to be usable for applying a constraint to a user position and wherein map elements of the second map element type are intended to be less usable for applying a constraint to a user position compared to the map elements of the first map element type. Thus, the map elements of the second aspect of the invention may correspond to the map elements of the first aspect of the invention. As an example, the database may represent the database explained with respect to the first aspect of the invention. For instance, map elements and/or transition nodes and/or map connector elements of the database may be created by a method and/or an apparatus of the first aspect of the invention.

The position may represent an estimated position of a user device, which may represent a portable user device. For instance, the position may be estimated based on WiFi positioning, and/or Bluetooth position, and/or inertial sensors (e.g. motion sensor), and/or terrestrial radio signal and may represent indoor positioning. Furthermore, if available, non-terrestrial signal, e.g. GNSS (e.g. GPS or GLONASS) or other positioning signals may be used for estimating the position.

However, such position estimated in indoor may be not very accurate, and thus, according to the second aspect, the database comprising at least one map element of a first map element type and at least one map element of a second map element type may be used for determining a constraint to the estimated position, if possible. This determined constraint can then be applied to the estimated position.

Thus, it is determined, based on a database comprising at least one map element of a first map element type and at least one map element of a second map element type, a map element of the database that can be associated with a position. (action 1210).

As an example embodiment, a map element of the database is considered to be associated with a position when the distance between the map element and the position is smaller than the distance between any other map element of the database and the position.

Thus, for instance, the map element of the database being the nearest map element with respect to the estimated position may be determined.

As an example embodiment, a map element of the database is considered to be associated with a position when the nearest distance between the map element and the position is below a threshold.

For instance, this threshold may be 8 m, 5 m, 3 m, 2.5 m, 2 m, 1.5 m or any other well-suited value.

Thus, for instance, the map element of the database being the nearest map element with respect to the estimated position may be determined if the distance between the map element and the position is below a threshold. If this distance criterion is not fulfilled, no map element may be determined and, for instance, when the estimated position changes, the method may start again at action 1210.

As an example embodiment, a map element of the database is considered to be associated with a position when, under the assumption that the map element is of the second map element type, the estimated position is within an area defined by the map element, wherein this area may be defined by a circle, or a rectangular, or ellipse, or any well-suited polygon.

Furthermore, as an example embodiment, action 1210 may further comprise checking, based on a database comprising at least one map element of a first map element type and at least one map element of a second map element type, whether a map element of the database can be associated with a position. Thus, for instance, if no good match can be found with respect to any of the map elements of the database, no map element is determined in action 1210 and the method may proceed at reference number 1205 and may continue tracking the estimated position, e.g. based on available positioning measurement. Accordingly, at this point in time no constraint would be applied to the position because no map element is determined in action 1210. For instance, this checking may result in the decision not to determine a map element if, as an example, the distance between the estimated position and the map elements is greater than a threshold, e.g. above one of the threshold values 100 m, 50 m, 20 m, 8 m, 5 m or any other well-suited value. Or, as an example, a boundary information on the building associated with the map may be used for this checking, wherein, for instance, if the distance between the estimated position and a boundary of the building is more than a threshold, it is checked that no map element is to be determined in action 1210 and the flowchart 1200 may proceed at reference number 1205 and may continue tracking the estimated position, e.g. based on available positioning measurement. Thus, no constraint may be applied to the position if it is decided not to determine a map element in action 1210.

As an example embodiment, before starting action 1210 the first time, a position in the map may be initialized by means of a position estimation as described above. This estimated position may be associated with a probability value being indicative of an estimated correctness of this position. E.g., when initializing such a position at an entrance of a building, this probability value may be set to a high value because the estimation of the position can be considered to be very reliable, e.g. due to direct contact to satellites of a positioning system. Furthermore, this probability of the estimated position may be updated during motion of the through the indoor of the map, as will be explained later. Furthermore, this probability of the estimated position may be taken into account when determining a map element of the database that can be associated with a position (action 1210). As an example, the above mentioned threshold may be weighted with the probability of the estimated position such that the weighted threshold value decreases in case the probability value increases and vice versa. Thus, the weighted threshold value may be relatively low in case the probability value is relatively high, and the weighted threshold value may be relatively high (compared to the relatively low weighted threshold value) in case the probability value is relatively low (compared to the relatively high probability value). This may have the effect that in case the estimated position is very accurate, i.e. the probability of estimated position is very high, a map element is only determined in action 1210 if it is quite close to this position—otherwise, as an example, flowchart 1200 may proceed at reference number 1205 and may continue tracking the estimated position, e.g. based on available positioning measurement. For instance, the probability associated with the estimated position may decrease while movement is performed indoor. Then, if a next position is estimated, flowchart may proceed with action 1210.

As an example embodiment, said determining a map element of the database that can be associated with a position (action 1210) may be performed based on plurality of estimated positions, wherein one position of the plurality of estimated positions may be the actually estimated position and at least one further position of the plurality of estimated position may represent at least one historic position. For instance, the previously estimated position or the at least two previously estimated positions may be taken into account in addition to the actual estimated position. For instance, the position used in action 1210 might represent an average position estimated based on the plurality of estimated positions. Or, as another example, directional information (e.g. heading information) may be determined based on the plurality of estimated positions and may be used in addition to the actual estimated position in order to determine a map element of the databased that can be associated with the actual position in action 1210.

It is then checked whether the determined map element is of the first map element type. (action 1220). In case the determined map element is of the first map element type, a constraint to be applied to the position is determined based on the determined map element. (action 1230).

Accordingly, this may enable that a constraint is applied to the position if the map element is of the first map element type and thus usable for applying a constraint, e.g., because this map element type of the first map element type may be associated with a small corridor, small room or the like which can be very useful for constraining a position.

Applying a constraint to a user position based on map elements, e.g. based on discrete graphs, is known in literature. For instance, the methods disclosed in "Investigating effective methods for integration of building's map with low cost inertial sensors and wifi-based positioning", IEEE 2013 International Conference on Indoor Positioning and Indoor Navigation (WIN) 28-31 Oct. 2013, pages 1-8, could be used for determining the constraint and applying it to the position.

For instance, the estimated position may be projected on the determined map element of the first map element type. Then, as an example, the position may be tracked, e.g. based on wireless positioning systems, motion sensors and/or a combination thereof, and the tracked position may be projected on the determined map element. Furthermore, as an example, the probability value being indicative of the accuracy of the estimated position may be increased compared to the former probability value being associated with a former position, if the position is provided with a constraint based on a map element of the first map element type (action 1230), because this map element may be considered to give additional information and very accurate information on the estimated position.

Accordingly, information on the building floor plan may be used to enable improvement of positioning.

For instance, in case the determined map element is not of the first map element type, the determined map element may represent a map element of the second element type, and method 1200 may proceed at reference sign 1225. As an example embodiment, in this case no constraint to a position may be determined and thus may not be applied to the position. As another example embodiment, in this case it may be determined whether it is nevertheless possible to determine a constraint to a position. Furthermore, as an example, the probability value being indicative of the accuracy of the estimated position may be decreased compared to the former probability value being associated with a former position in case the determined map element is not of the first map element type, e.g., because the map element is of the second map element type and may be considered to be not very well-suited to provide further information on the position.

For instance, with respect to the example depicted in FIG. 8, if the estimated position is at position 825 which is in an area defined by the determined map element 421 of the second map element type, it is determined to no constraint to a position is determined and thus not be applied to the position, because no further useful information is present to perform better accuracy of positioning based on the map element 421. However, if the position 826 may be outside the area defined by determined map element 421, it may be decided to determine a constraint to the position 826, because this position 826 might be assumed to represent an unadmissible "wall-crossing" position. Then, for instance, a constraint may be determined that corrects the position 826 to a position 827 within the area defined by the determined map element 421, wherein this position 827 may represent a position in the area defined by the determined map element 421 being the nearest position to the estimated position 826. For this reason, map elements of the second map element type might be considered to be less usable for applying a constraint compared to map elements of the first map element types, because map elements of the second map element type might, under certain circumstances, nevertheless useful for applying a constraint to a position. It has to be understood that other methods for determining a constraint based on map elements of the second map element type, if possible, might be used.

Accordingly, it may be achieved not to apply the same constraint in all types of indoor spaces which would not always result in performance improvement, because indoor space usually has very different architecture inside a building. These places due to their different architecture may or may not be useful for applying constraint to human motion, and this may be taken into account with respect to apparatus 1100 or method 1200. Thus, producing additional error in the positioning system based on an unappropriate constraint based on large spaces, open space, large rooms, or large halls or the like may be omitted.

As an example embodiment, said at least one map element of a first map element type and said at least one map element of the second map element type represent a plurality of map elements.

For instance, the plurality of map elements are associated with a floor plan, as explained as example with respect to the first aspect.

As an example embodiment of the second aspect, elements of the second map element type represent multi-dimensional elements, as explained as example with respect to the first aspect.

As an example embodiment of the second aspect, said multi-dimensional elements represent open space, as explained as example with respect to the first aspect.

As an example embodiment of the second aspect, elements of the first map element type represent one-dimensional elements, as explained as example with respect to the first aspect.

As an example embodiment of the second aspect, elements the first map element type represent discrete graphs, as explained as example with respect to the first aspect.

As an example embodiment of the second aspect, the database further comprises at least one transition node element, wherein each of the at least one transition node element is associated with a first map element of the plurality of map elements and with a second map element of the plurality of map elements and is associated with a transition position between the first map element and the second map element. These transition nodes may represent the transition nodes of the first aspect.

Figure 13:
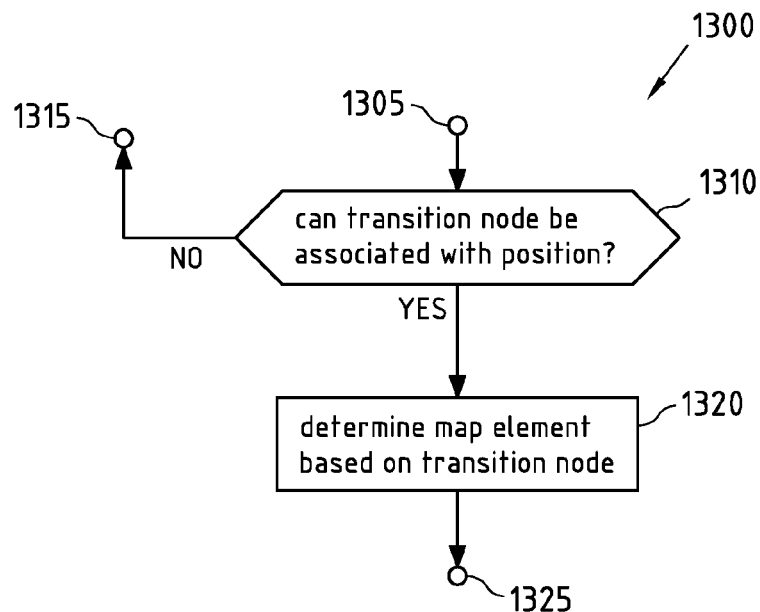
FIG. 13 is a flow chart illustrating an example embodiment of a method according to the second aspect.
Figure 14:
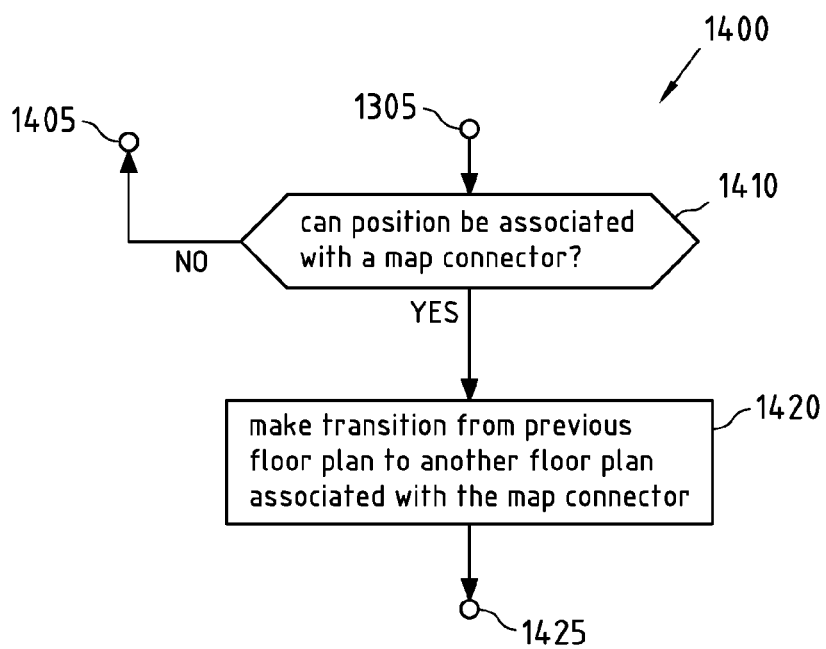
FIG. 14 is a flow chart illustrating an example embodiment of a method according to the second aspect.

Example operations in the apparatus of FIG. 11 will now be described with reference to FIG. 13 depicting a flow chart 1300 illustrating an example embodiment of the second aspect.

It is determined whether a transition node can be associated with a position. (action 1310). For instance, this position may represent an estimated position which is tracked during a movement of a user device. As an example, method 1300 may be performed after method 1200 has been performed, e.g. reference sign 1225 or reference sign 1235 in FIG. 12 may jump to reference 1305 in FIG. 13. For instance, the position may represent an actual position which may change due to movement.

As an example embodiment of the second aspect, a transition node may be determined to be associated with the position if the distance between the transition node and the position is below a threshold. For instance, this threshold may be 2 m, 1 m, 0.5 m, 0.25 m or any other well-suited value.

Furthermore, as an example embodiment of the second aspect, determining whether a transition node can be associated with the position (action 1310) may comprise determining at least two transition nodes which can be associated with the position, the method 1300 further comprising selecting one transition node of the at least two transition nodes based in a heading information relating to a movement. Thus, for instance, the position may be used to determine a subset of transition nodes closest to the user, e.g. the transition nodes having a distance to the position being below a distance threshold, which might represent the above mentioned distance threshold, while heading can be used to determine a transition node of this subset of transition nodes in the direction of the movement. For instance, it is determined to be positive that a transition node can be associated with the position (action 1310) if a transition node can be determined which fulfils the distance threshold and is present in the direction of movement, e.g. user movement.

If no transition node can be associated with the position (action 1310), the method may proceed with method 1200, wherein reference sign 1315 of method 1300 may jump to reference sign 1223 if the determined map element is of the first map element type or may jump to reference sign 1224 if the determine map element is not of the first map element type (i.e., of the second map element type). Thus, when no transition between an actual map element and a new actual map element is determined, it may be considered that the actual map element has not changed and thus still can be considered as actual map element. Nevertheless, it may also be jumped from reference sign 1315 to reference sign 1205 in FIG. 12 in order perform actions 1210 and 1220 once again. For instance, in a same way it may be jumped from reference sign 1315 to reference sign 1224 in FIG. 12 or to reference sign 1205 in FIG. 12.

If a transition node can be associated with the position (action 1310), a map element may be determined based on the determined transition node (action 1320). For instance, the map element determined in action 1310 represents another map element as the map element previously determined in action 1210. The transition node may indicate at least one map element being associated (e.g, being linked) with the previously determined map element, wherein the another map element is selected from this at least one map element. For instance, if there are two or more map elements being associated with the previously determined map element, a heading information on the movement of a user (or portable device) may be used to select in appropriate map element of the two or more map elements, e.g. depending on the direction of the heading.

As an example embodiment, if it is determined that a transition from the determined map element to another map element can be performed, selecting the other map element (based on action 1320) can be performed, and, if the other map element is of the first map element type, a constraint to be applied to the position based on the selected map element may be determined and may for instance be applied to the position. Thus, for instance, reference sign 1325 of method 1300 may jump to reference sign 1215 of method 1200.

Accordingly, as an example, the position may be tracked during movement and it may be determined whether a transition from an actual map element to a new map element is performed with respect to the floor plan associated with the plurality of map elements in the database.

As an example embodiment of the second aspect, the plurality of map elements are associated with a first floor plan, the database comprising at least one further plurality of map elements, wherein each of the at least one further plurality of map elements is associated with a respective further floor plan and comprises at least one map element of the first map element type and at least one map element of the second map element type, the database further comprising at least one map connector, wherein each of the at least one map connector connects a floor plan from the first floor plan and the at least one further floor plan with another floor plan from the first floor plan and the at least one further floor plan, wherein each map connector is either of the first map element type or of the second map element type.

Furthermore, as an example embodiment of the second aspect, each of the at least one further plurality of map elements comprises at least one transition node, wherein each of the at least one transition node element is associated with a first map element of the respective plurality of map elements and with a second map element of the respective plurality of map elements and is associated with a transition position between the first map element and the second map element.

Furthermore, as an example, at least one transition node may be associated with an entrance of a building. An entrance might be something that connects outside area of this building with inside area of this building (e.g. a door). For instance, such a transition node being associated with an entrance of a building might be further associated with a map element of the first or second map element type, wherein this map element is associated with the inside of the building. Furthermore, this transition node may be associated with another map element being outside this building, wherein this other map element may represent the above mentioned map connector which can then be used to connect a floor plan of the first building comprising said entrance with a second floor plan of another building. As an example, this other map element may be connected to the transition node of another building. For instance, this other map element might be a bridge (e.g. a skywalk) to another building. Or, as another example, the transition node may be associated with another transition node of another building, wherein this other transition node may also be associated with an entrance of this other building.

Example operations in the apparatus of FIG. 11 will now be described with reference to FIG. 4 depicting a flow chart 1400 illustrating an example embodiment of the second aspect.

It is determined whether the position can be associated with a map connector (action 1410). As an example embodiment of the second aspect, a map connector may be determined to be associated with the position if the distance between the map connector and the position is below a threshold. For instance, this threshold may be 2 m, 1 m, 0.5 m, 0.25 m or any other well-suited value. Or, when a transition node can be associated with the position (action 1310), it may be checked whether this transition node is associated with a map connector and thus, this map connector may be associated with the position, e.g. based on the heading of the movement. And/or, as an example, if the transition node is associated with an entrance, position information on this entrance can be used as constraint to be applied to the estimated position. Thus, as an example, if the position can be associated with a transition node, a constraint to be applied to the position can be determined if the associated transition is associated with an entrance and, for instance, this constraint can be applied to the estimated position.

If a map connector can be associated with the position, it might be checked whether this map connector is of the first map element type or of the second map element type. If the map connector is of the first element type, a constraint to be applied to the position may be determined based on the map connector, similar as described with respect to action 1230 in light of the map element of the first map element type. Furthermore, if the map connector is of the second element type, no constraint may be applied to the position, as explained above with respect to the options of reference sign 1225, or, if possible, a constraint to be applied may be determined, e.g. when the actual estimated position is without an area associated with the map connector, as explained above.

Furthermore, a transition from the previous floor plan to another floor plan associated with the map connector might be performed. (action 1420)

Thus, for instance, another plurality of map elements may be selected which is associated with the other floor plan, wherein this other plurality of map may serve as basis in actions 1210 and 1310. As an example, flow chart 1400 may jump from reference sign 1425 to reference sign 1305 of flowchart 1300 depicted in FIG. 13 or to reference sign 1205 of flow chart 1200 depicted in FIG. 12.

Figure 15:
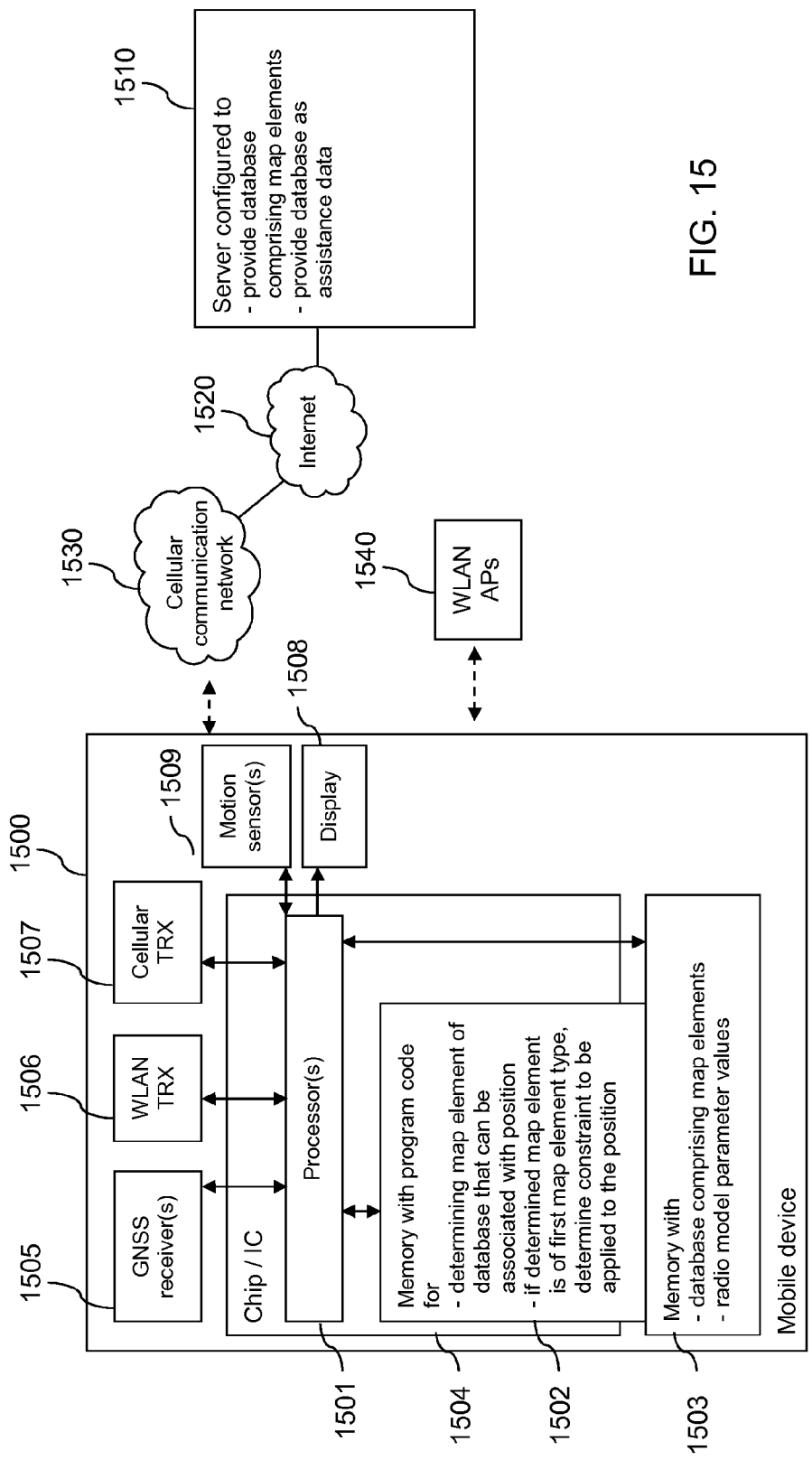
FIG. 15 is a schematic block diagram of an example embodiment of an apparatus according to the second aspect.

FIG. 15 is a schematic block diagram of a first example embodiment of a system according to the second aspect of the invention. The system may support applying constraints for a position.

The system comprises a mobile device 1500 and a location server 1510. The system further comprises a network 1520, by way of example the Internet. The system may further comprise a cellular communication network 1530 that is connected to the Internet 1520. The system may further comprise a number of WLAN access points (AP) 1540.

Mobile device 1500 may be for instance a mobile terminal, like a regular smartphone or a dedicated surveying device. Mobile device 1500 comprises a processor 1501 that is linked to a first memory 1502, to a second memory 1503, to at least one optional GNSS receiver 1505, to an optional WLAN component 1506, to an optional cellular communication component 1507 and to a display 1508. The mobile device 1500 may further comprises at least one optional motion sensor 1509 which might comprise one or more accelerometers, and/or at least one gyroscopes, and/or at least one magnetometer. Thus, for instance, wireless positioning and motion sensors may be combined for estimating the position of the mobile device 1500.

Processor 1501 is configured to execute computer program code, including computer program code stored in memory 1502, in order to cause mobile device 1500 to perform desired actions.

Memory 1502 stores computer program code for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, for determining a constraint to be applied to the position based on the map element. Some of the program code in memory 1502 may be similar to the program code in memory 1102. In addition, memory 1502 could store computer program code configured to realize other functions. In addition, memory 1502 could also store other kind of data.

Processor 1501 and memory 1502 may optionally belong to a chip or an integrated circuit 1504, which may comprise in addition various other components, for instance a further processor or memory.

Memory 1503 is configured to store data, which may include a database comprising map elements. Thus, this database may represent any of the databases described with respect to the first or second aspect of the invention.

Furthermore, it memory 1502 may store computer program code for contacting the optional location server 1510, e.g. in order to receive the optional database or updates for the database from the location server 1510.

The at least one GNSS receiver 1505 could comprise any kind of global navigation satellite signal receiver for example a GPS receiver and/or a GLONASS receiver and/or a GALILEO receiver. It may be configured to receive corresponding satellite signals and to determine the current position of mobile device 1500 based on the signals, possibly using assistance data. For instance, this current position may be used as position in the second aspect of the invention, and the determined constraint may be applied to this current position in order to obtain a corrected position, wherein this correction position may be displayed on display 1508.

Optional WLAN component 1506 includes at least a WLAN transceiver (TRX). WLAN component 1506 enables mobile device 1500 to perform radio measurements on radio signals that are broadcast by WLAN access points 1540. In addition, it may enable mobile device 1500 to establish a connection with WLAN access points 1540 for accessing the associated WLAN. It is to be understood that any computer program code based processing required for a WLAN communication could be stored in an own memory of WLAN component 1506 and executed by an own processor of WLAN component 1506, or it could be stored for example in memory 1502 and executed for example by processor 1501.

Optional cellular communication component 1507 includes at least a cellular transceiver. It enables mobile device 1500 to communicate with other entities via cellular communication network 1530. It could be a cellular engine that is configured to take care of all processing required for a cellular communication. Alternatively, at least some of the processing that is required for a cellular communication may be realized by processor 1501 executing corresponding additional program code stored in memory 1502.

Display 1508 could be a touchscreen or a display that is not touch sensitive.

It is to be understood that mobile device 1500 could comprise various other components, like user input means and speakers.

Component 1504 or mobile device 1500 could be an example embodiment of an apparatus according to the second aspect of the invention.

Optional location server 1510 is a server that is configured to receive fingerprints and/or radio model data from various mobile devices via the Internet 1520, to generate assistance data for a WLAN based positioning based on the received data, to cause storage of the assistance data and to provide the assistance data to mobile terminals or other entities upon request. It could also be configured to carry out positioning computations upon request based on provided radio measurements. Server 1510 could comprise a memory for storing the assistance data or it could be configured to access an external memory storing the assistance data, optionally via another server. Furthermore, server 1510 may provide a database which comprises map elements, wherein this database may represent any of the databases described with respect to the first or second aspect of the invention. Accordingly, this database or parts of the database may be provided to the mobile device 1500, e.g. for providing updates or for providing a new database.

Cellular communication network 1530 could be any kind of cellular communication network, like a Global System for Mobile Communications (GSM), a CDMA2000, a Universal Mobile Telecommunications System (UMTS), or a long term evolution (LTE) based communication network.

The WLAN access points (AP) 1540 could be access points of one or more WLANs. The WLAN or WLANs may but do not have to be connected to the Internet 1520.

Figure 16:
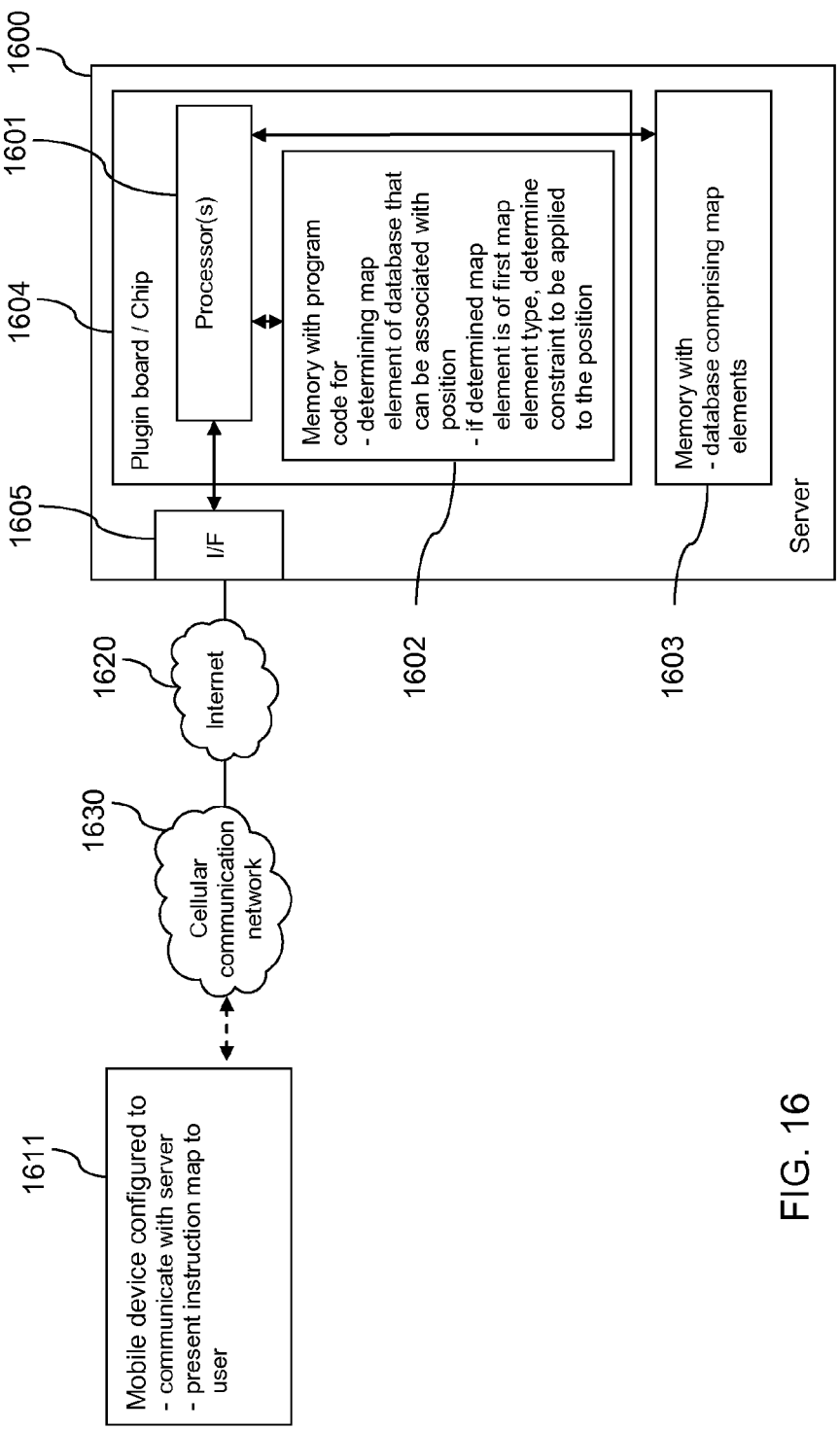
FIG. 16 is a schematic block diagram of an example embodiment of an apparatus according to the second aspect.

FIG. 16 is a schematic block diagram of a second example embodiment of a system according to the second aspect of the invention. In this case, the system may support applying a constraint to a position.

The system comprises a server 1600 and a plurality of mobile devices 1611, 1612. The system further comprises a network 1620, by way of example the Internet. The system further comprises a cellular communication network 1630 that is connected to the Internet 1620.

Server 1600 may be for instance a server that is provided for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, for determining a constraint to be applied to the position based on the map element. Server 1600 comprises a processor 1601 that is linked to a first memory 1602, to a second memory 1603 and to an interface (I/F) 1605.

Processor 1601 is configured to execute computer program code, including computer program code stored in memory 1602, in order to cause server 1600 to perform desired actions.

Memory 1602 stores computer program code for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, and for determining a constraint to be applied to the position based on the map element. Some of the program code may be similar to the program code stored in memory 1602. In addition, memory 1602 could store computer program code configured to realize other functions, for instance program code for generating positioning assistance data, for providing assistance data to mobile devices upon request and/or for performing positioning computations for mobile devices upon request. In addition, memory 1602 could also store other kind of data.

Processor 1601 and memory 1602 may optionally belong to a plug-in board or a chip with an integrated circuit 1604, which may comprise in addition various other components, for instance a further processor or memory.

Memory 1603 is configured to store data, which may include a database comprising map elements. Thus, this database may represent any of the databases described with respect to the first or second aspect of the invention. In addition, it could store other data, including for example assistance data for a WLAN based positioning.

It is to be understood that the data of memory 1603 could also be distributed to several memories, which may be partly or completely external to server 1600. For example, fingerprints and parameter values of radio models that are stored for performing a quality check could be stored internal to server 1600 and computed final assistance data could be stored at an external memory that is accessible via another server.

Interface 1605 is a component which enables server 1600 to communicate with other devices, like mobile device 1611 and 1612, via networks 1620 and 1630. It could also enable server 1600 to communicate with other entities, like other servers. Interface 1605 could comprise for instance a TCP/IP socket.

It is to be understood that server 1600 could comprise various other components.

Component 1604 or server 1600 could be an example embodiment of an apparatus according to the first and/or second aspect of the invention.

Mobile device 1611 may be for instance mobile terminals, like regular smartphones or dedicated surveying devices. They are configured to communicate with server 1600 and to present information to a user. Mobile devices 1611, 1612 may be similar to mobile device 1500 of FIG. 15, except that they do not have to have program code for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and in case the determined map element is of the first map element type, and for determining a constraint to be applied to the position based on the map element.

Cellular communication network 1630 could be again any kind of cellular communication network.

The WLAN access points (AP) 1640 could be again access points of one or more WLANs. The WLAN or WLANs may but do not have to be connected to the Internet 1620.

While the systems of FIG. 16 and FIG. 15 are different in that the system of FIG. 15 enables a mobile device 1500 to perform determining a constraint to be applied to the position based on map element determined by the mobile device 1500, the actual operations that are carried out for determining, based on a database comprising at least one map element of a first map element type and at least one map element of a second map element type, a map element of the database that can be associated with a position; and in case the determined map element is of the first map element type, and for determining a constraint to be applied to the position based on the map element, may be similar.

For instance, a position of a mobile device 1611, 1612 might be estimated at the mobile device, as described with respect to mobile device 1500, and this position may be communicated via the internet 1620 to server 1600, wherein the server performs determining, based on a database comprising at least one map element of a first map element type and at least one map element of a second map element type, a map element of the database that can be associated with the position; and in case the determined map element is of the first map element type, and performs determining a constraint to be applied to the position based on the map element. This constraint may be communicated via the internet to the respective mobile device 1611, 1612 and a corrected position may be obtained at the mobile device based on the received constraint. Or, as another example, the server 1600 may be configured to obtain this corrected position and may communicate the correct position to the respective mobile device 1611, 1612.

As another example, the server 1600 may be configured to estimate the actual position of mobile device 1611, 1612, e.g. based on a fingerprint received from the mobile device 1611, 1612, and this estimated actual position may be corrected by means of a constraint, if possible. Then, this correct position may be transmitted to the respective mobile device 1611, 1612.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 17:
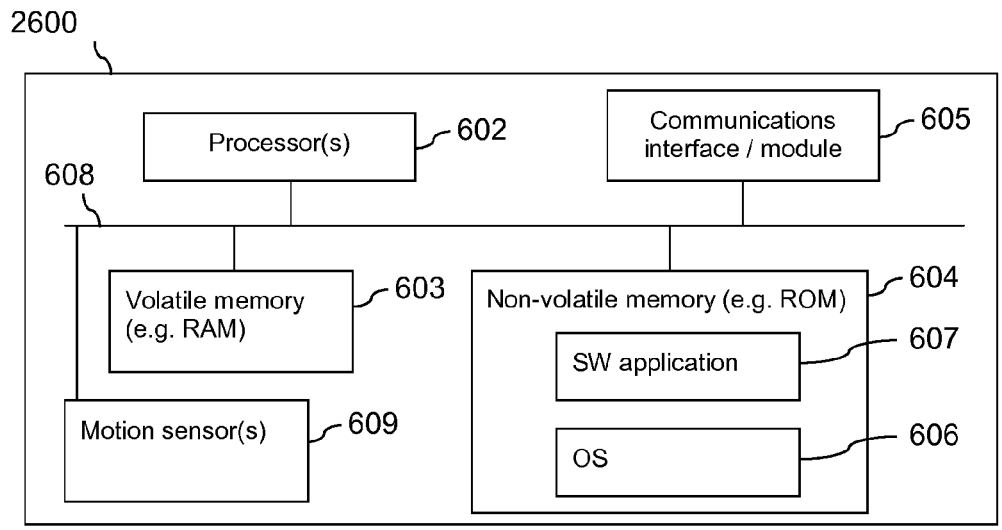
FIG. 17 is a schematic block diagram of an example embodiment of an apparatus.
Figure 18:
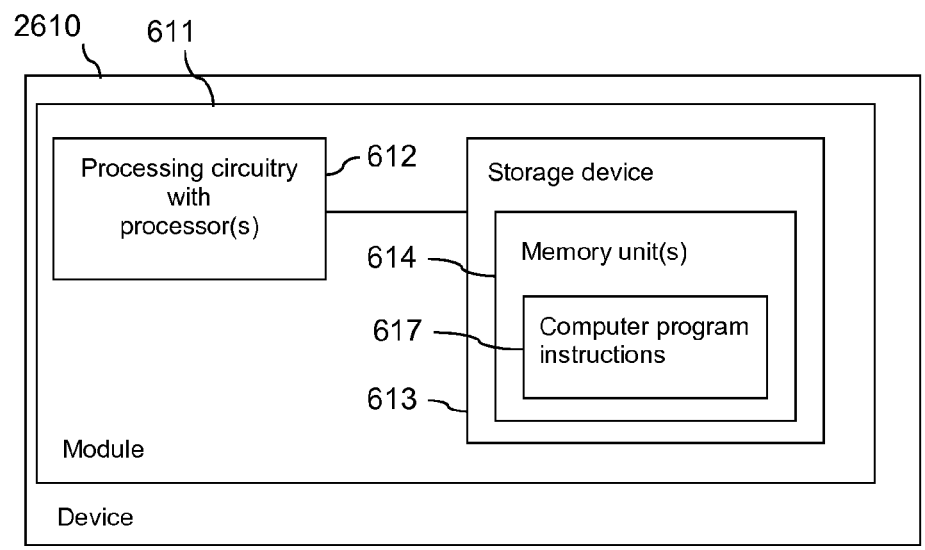
FIG. 18 is a schematic block diagram of an example embodiment of an apparatus.

Example embodiments of the first aspect and/or of the second aspect using at least one processor and at least one memory as a non-transitory data medium are shown in FIGS. 17 and 18.

FIG. 17 is a schematic block diagram of a device 2600. Device 2600 includes a processor 602. Processor 602 is connected to a volatile memory 603, such as a RAM, by a bus 608. Bus 608 also connects processor 602 and RAM 603 to a non-volatile memory 604, such as a ROM. A communications interface or module 605 is coupled to bus 608, and thus also to processor 602 and memories 603, 604. The device 2000 may further comprises at least one optional motion sensor 609 which might comprise one or more accelerometers, and/or at least one gyroscopes, and/or at least one magnetometer. Within ROM 604 is stored a software (SW) application 607. Software application 607 may be a positioning application, although it may take some other form as well. An operating system (OS) 606 also is stored in ROM 604.

FIG. 18 is a schematic block diagram of a device 2610. Device 2610 may take any suitable form. Generally speaking, device 2610 may comprise processing circuitry 612, including one or more processors, and a storage device 613 comprising a single memory unit or a plurality of memory units 614. Storage device 613 may store computer program instructions 617 that, when loaded into processing circuitry 612, control the operation of device 2610. Generally speaking, also a module 611 of device 2610 may comprise processing circuitry 612, including one or more processors, and storage device 613 comprising a single memory unit or a plurality of memory units 614. Storage device 613 may store computer program instructions 617 that, when loaded into processing circuitry 612, control the operation of module 611.

The software application 607 of FIG. 17 and the computer program instructions 617 of FIG. 18, respectively, may correspond e.g. to the computer program code in any of memories 102, 1002, 1102, 1502, or 1602, respectively.

Figure 19:
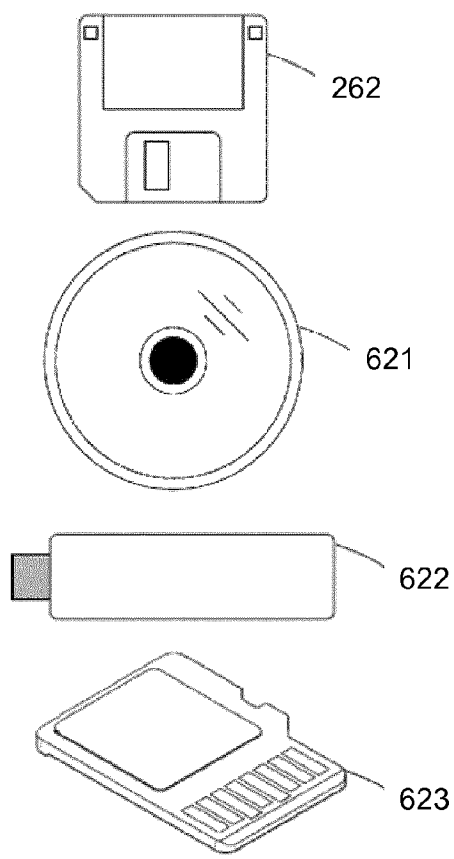
FIG. 19 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 19, which presents, from top to bottom, schematic diagrams of a magnetic disc storage 2620, of an optical disc storage 621, of a semiconductor memory circuit device storage 622 and of a Micro-SD semiconductor memory card storage 623.

The functions illustrated by processor 101 in combination with memory 102, or processor 1001 in combination with memory 1002, or component 1004, can also be viewed as means for determining, based on a geometrical criterion and at least one map object of plurality of map objects, whether a map element of a first map element type or a second map element type shall be created; wherein elements of the first map element type are intended to be usable for applying a constraint to a user position and wherein elements of the second map element type are intended to be less usable for applying a constraint to a user position compared to the elements of the first map element type; and means for creating a map element according to the determined map element type, the created map element being associated with the at least one map object.

The program codes in memories 102 and 1002 can also be viewed as comprising such means in the form of functional modules.

The functions illustrated by processor 1101 in combination with memory 1102, or processor 1501 in combination with memory 1502, or component 1504, or processor 1601 in combination with memory 1602, or component 1604 can also be viewed as means for determining, based on a database comprising at least one map element of a first map element type and at least one map element of a second map element type, a map element of the database that can be associated with a position; wherein map elements of the first map element type are intended to be usable for applying a constraint to a user position and wherein map elements of the second map element type are intended to be less usable for applying a constraint to a user position compared to the map elements of the first map element type; and means for, in case the determined map element is of the first map element type, determining a constraint to be applied to the position based on the map element.

The program codes in memories 1102, 1502 and 1602 can also be viewed as comprising such means in the form of functional modules.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. An apparatus comprising at least one processor and at least one memory including computer program code, the at least one memory and the computer program code configured to, with the at least one processor, cause the apparatus at least to perform:
determine, based on a geometrical criterion and at least one map object of a plurality of map objects, whether a map element of a first map element type or a second map element type shall be created, wherein map elements of the first map element type are associated with spaces that are narrower or smaller than spaces with which map elements of the second map element type are associated, wherein the computer program code determine whether a map element of the first map element type or the second map element type shall be created; and wherein map elements of the first map element type are usable for applying a constraint to a user position and map elements of the second map element type are less usable for applying a constraint to a user position compared to the map elements of the first map element type; and
create a map element according to the determined map element type, the created map element being associated with the at least one map object.

2. An apparatus according to claim 1, wherein the plurality of map objects are associated with a floor plan.

3. An apparatus according to claim 1, wherein the geometrical criterion comprises a distance threshold, and wherein determining whether a map element of a first map element type or a second map element type shall be created comprises checking whether a distance associated with the at least one map object of the plurality of map objects is below the distance threshold.

4. An apparatus according to claim 3, wherein the distance threshold depends on a building associated with the plurality of map objects.

5. An apparatus according to claim 3, wherein creating a map element comprises creating a map element of the first map element type in an instance in which the distance associated with the at least one map object is below the distance threshold and creating a map element of the second map element type in an instance in which the distance associated with the at least one map object is equal to or above the distance threshold.

6. An apparatus according to claim 3, wherein the at least one map object represents a multi-dimensional area, and wherein the distance associated with the at least one map object is a smallest distance of a plurality of distances defined by the multi-dimensional area.

7. An apparatus according to claim 1, wherein the geometrical criterion comprises a multi-dimensional reference object, and wherein determining whether a map element of a first map element type or a second map element type shall be created comprises checking whether the multi-dimensional reference object fits into an area associated with the map object.

8. A method implemented by execution of computer program code, the method comprising:
determining, based on a geometrical criterion and at least one map object of a plurality of map objects, whether a map element of a first map element type or a second map element type shall be created, wherein map elements of the first map element type are associated with spaces that are narrower or smaller than spaces with which map elements of the second map element type are associated, wherein the computer program code determine whether a map element of the first map element type or the second map element type shall be created; and wherein map elements of the first map element type are usable for applying a constraint to a user position and map elements of the second map element type are less usable for applying a constraint to a user position compared to the map elements of the first map element type; and
creating a map element according to the determined map element type, the created map element being associated with the at least one map object.

9. A method according to claim 8, wherein the plurality of map objects are associated with a floor plan.

10. A method according to claim 8, wherein the geometrical criterion comprises a distance threshold, and wherein determining whether a map element of a first map element type or a second map element type shall be created comprises checking whether a distance associated with the at least one map object of the plurality of map objects is below the distance threshold.

11. A method according to claim 10, wherein the distance threshold depends on a building associated with the plurality of map objects.

12. A method according to claim 10, wherein creating a map element comprises creating a map element of the first map element type in an instance in which the distance associated with the at least one map object is below the distance threshold and creating a map element of the second map element type in an instance in which the distance associated with the at least one map object is equal to or above the distance threshold.

13. A method according to claim 10, wherein the at least one map object represents a multi-dimensional area, and wherein the distance associated with the at least one map object is a smallest distance of a plurality of distances defined by the multi-dimensional area.

14. A method according to claim 8, wherein the geometrical criterion comprises a multi-dimensional reference object, and wherein determining whether a map element of a first map element type or a second map element type shall be created comprises checking whether the multi-dimensional reference object fits into an area associated with the map object.

15. An apparatus comprising at least one processor and at least one memory including computer program code, the at least one memory and the computer program code configured to, with the at least one processor, cause the apparatus at least to perform:

determine, for a respective map element and based on a database comprising at least one map element of a first map element type and at least one map element of a second map element type, a map element type associated with a position, wherein map elements of the first map element type are associated with spaces that are narrower or smaller than spaces with which map elements of the second map element type are associated, wherein the computer program code determine whether the map element type associated with the position is the first map element type or the second map element type; and wherein map elements of the first map element type are usable for applying a constraint to a user position and map elements of the second map element type are less usable for applying a constraint to a user position compared to the map elements of the first map element type and in case the determined map element is of the first map element type, determine a constraint to be applied to the position based on the map element.

16. An apparatus according to claim 15, wherein the map element type of the respective map element is dependent upon a distance threshold.

17. An apparatus according to claim 16, wherein the distance threshold depends on a building that includes the spaces with which the map elements are associated.

18. An apparatus according to claim 16, wherein a map element is of the first map element type in an instance in which the space with which the map element is associated defines a distance that is below the distance threshold, wherein a map element is of the second map element type in an instance in which the space with which the map element is associated defines a distance that is equal to or above the distance threshold.

19. An apparatus according to claim 18, wherein the space with which the map element is associated is a multi-dimensional area, and wherein the distance associated with the space is a smallest distance of a plurality of distances defined by the multi-dimensional area.

20. An apparatus according to claim 15, wherein in case the determined map element is of the second map element type, determine that no constraint is to be applied to the position based on the map element.

* * * * *